(12) United States Patent
Ohsawa

(10) Patent No.: US 6,470,151 B1
(45) Date of Patent: Oct. 22, 2002

(54) CAMERA, IMAGE CORRECTING APPARATUS, IMAGE CORRECTING SYSTEM, IMAGE CORRECTING METHOD, AND COMPUTER PROGRAM PRODUCT PROVIDING THE IMAGE CORRECTING METHOD

(75) Inventor: Toshifumi Ohsawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 09/593,515

(22) Filed: Jun. 14, 2000

(30) Foreign Application Priority Data

Jun. 22, 1999 (JP) .......................................... 11-175266

(51) Int. Cl.$^7$ ............................................. G03B 17/24
(52) U.S. Cl. .......................... 396/311; 348/64; 396/322

(58) Field of Search ................................. 396/310, 311, 396/319, 322; 348/64

(56) References Cited

U.S. PATENT DOCUMENTS 6,088,470 A * 7/2000 Camus et al. ................ 351/207

* cited by examiner

Primary Examiner—David M. Gray
(74) Attorney, Agent, or Firm—Robin, Blecker & Daley

(57) ABSTRACT

In a camera, an image correcting apparatus, an image correcting system, an image correcting method or a computer program product providing the image correcting method, an object image is recorded as a photo-taking image, and an object image obtained at a point of time different from a point of time at which the photo-taking image is obtained is recorded as a correction image to be used for correcting the photo-taking image.

30 Claims, 16 Drawing Sheets

| 1 | YEAR, MONTH, DAY, HOUR, MINUTE |
| --- | --- |
| 2 | PRINT ASPECT |
| 3 | USE OR NONUSE OF FLASH DEVICE |
| 4 | OBJECT LUMINANCE |
| 5 | OBJECT DISTANCE |
| 6 | INSTRUCTION FOR CORRECTION OF MAIN IMAGE |
| 7 | POSITION OF CORRECTION OF MAIN IMAGE |
| 8 | IMAGE OUTPUT FORM |
| 9 | AUXILIARY IMAGE DATA 1 |
| 10 | AUXILIARY IMAGE DATA 2 |

FIG. 6(a) byte1

| bit7 | bit6 | bit5 | bit4 | bit3 | bit2 | bit1 | bit0 |
|---|---|---|---|---|---|---|---|
| SEL | MEDIA2 | MEDIA1 | MEDIA0 | MODI3 | MODI2 | MODI1 | MODI0 |

FIG. 6(b) byte2

| bit7 | bit6 | bit5 | bit4 | bit3 | bit2 | bit1 | bit0 |
|---|---|---|---|---|---|---|---|
|  |  |  | X4 | X3 | X2 | X1 | X0 |

FIG. 6(c) byte3

| bit7 | bit6 | bit5 | bit4 | bit3 | bit2 | bit1 | bit0 |
|---|---|---|---|---|---|---|---|
|  |  |  | Y4 | Y3 | Y2 | Y1 | Y0 |

FIG. 6(d)

|  | X0 | X1 | X2 | X3 | X4 |
|---|---|---|---|---|---|
| Y0 | 1 | 2 | 3 | 4 | 5 |
| Y1 | 6 | 7 | 8 | 9 | 10 |
| Y2 | 11 | 12 | 13 | 14 | 15 |
| Y3 | 16 | 17 | 18 | 19 | 20 |
| Y4 | 21 | 22 | 23 | 24 | 25 |

CAMERA, IMAGE CORRECTING APPARATUS, IMAGE CORRECTING SYSTEM, IMAGE CORRECTING METHOD, AND COMPUTER PROGRAM PRODUCT PROVIDING THE IMAGE CORRECTING METHOD

BACKGROUND OF THE INVENTION

1. Field of the Invention

The present invention relates to a camera, an image correcting apparatus, an image correcting system, an image correcting method and a computer program product providing the image correcting method, each of which has the function of correcting an image obtained by photo-taking.

2. Description of Related Art

In recent years, there has been known a new photographic system, in which a photographic film is provided with a magnetic recording part, a camera is arranged to record photo-taking data or the like at the magnetic recording part during photo-taking, and the photo-taking data is read out and used later in processing the film for developing or printing.

Further, in Japanese Laid-Open Patent Application No. Hei 7-281285, etc., there has been proposed a camera which is adapted for photo-taking with a film of the above-stated kind and further includes an image sensor and a monitor so as to display and record electronic images obtained through photoelectric conversion by the image sensor. The arrangement of the camera disclosed will be hereinafter called the prior art.

According to the prior art, some correction information is added to images on an exposed film and correction is made on the images as necessary according to the correction information on the side of a printer.

Further, according to the prior art, an electronic image picked up by the image sensor at about the same time as an exposure action on the film is stored in a memory, and the electronic image stored is used in correcting the image on the side of the printer. Thus, the prior art permits correction of a red-eye phenomenon, a whole color tone or trimming and also a continuous montaging process on a plurality of images.

However, correction of finished photographs is desired, in many cases, with respect to the timing of photo-taking, for example, in such cases where a person posing for a portrait happened to close the eyes, happened to make undesirable facial expression or happened to take the undesirable pose, or where some unwanted things suddenly come to move across in front of people lined up for commemorative photographing or the like with a self-timer function used for photo-taking.

Correction of such an image on the side of the printer requires some special art for creating another image of the person or creating a background after removal of an obstacle. Such a correction process, however, cannot be adequately carried out in a short period of time.

BRIEF SUMMARY OF THE INVENTION

It is one aspect of the invention to provide a camera, an image correcting apparatus, an image correcting system, an image correcting method and a computer program product providing the image correcting method, each of which is arranged to record an object image as a photo-taking image and to record, as a correction image to be used for correcting the photo-taking image, an object image obtained at a point of time different from a point of time at which the photo-taking image is obtained, so that the photo-taking image can be appropriately corrected with the correction image.

The above and other aspects of the invention will become apparent from the following detailed description of preferred embodiments thereof taken in connection with the accompanying drawings.

BRIEF DESCRIPTION OF THE SEVERAL VIEWS OF THE DRAWING

FIGS. 6(a) to 6(d) are conceptual diagrams showing the form of storage of each information about an instruction of correction of a main image, the position of correction and the image output form to be stored by the camera shown in FIGS. 1(a) and 1(b).

DETAILED DESCRIPTION OF THE INVENTION

Hereinafter, preferred embodiments of the invention will be described in detail with reference to the drawings.

FIRST EMBODIMENT

A first embodiment of the invention is described below with reference to FIGS. 1(a) and 1(b) to FIG. 12.

Figure 1A:
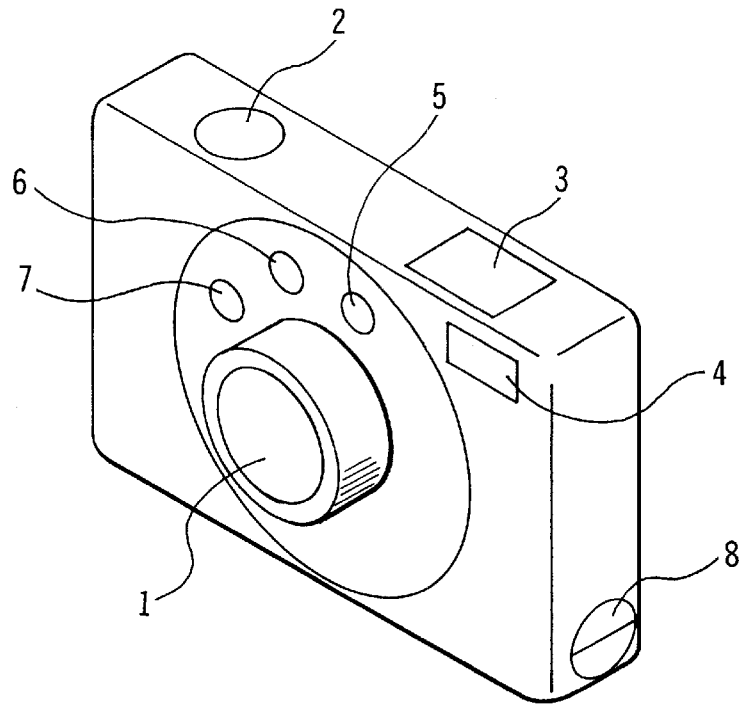
FIGS. 1(a) and 1(b) are perspective views showing the appearance of a camera according to a first embodiment of the invention.
Figure 1B:
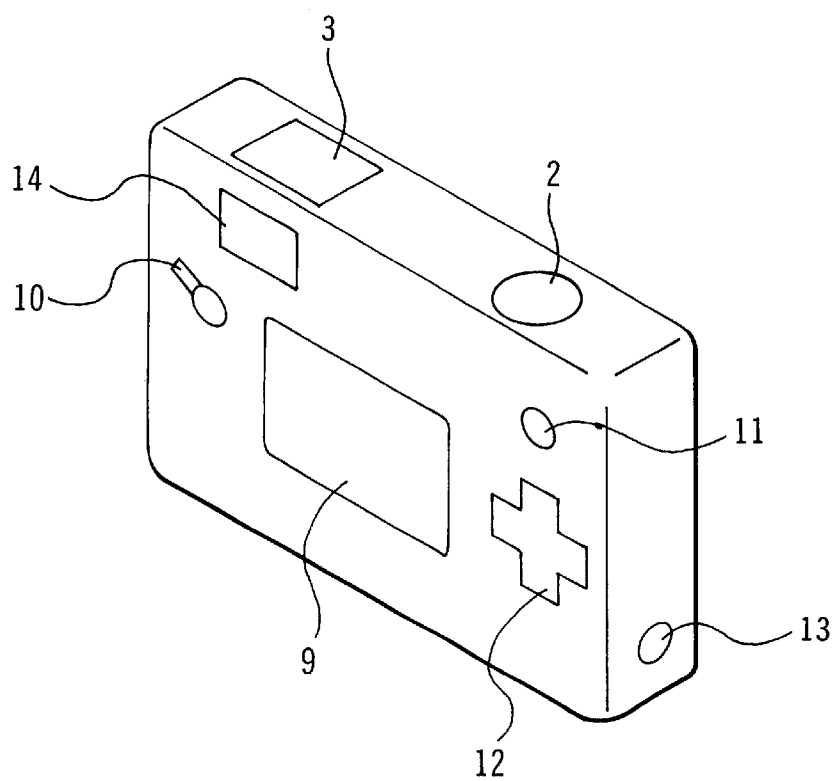

FIGS. 1(a) and 1(b) are perspective views showing the appearance of a camera according to the first embodiment of the invention. FIG. 1(a) shows the camera as viewed from its front side and FIG. 1(b) shows the camera as viewed from its rear side.

In FIGS. 1(a) and 1(b), there are illustrated a photo-taking lens 1, a shutter button 2, a display device 3 which is composed of a liquid crystal display panel, etc., and is arranged to make a film count display, a warning display, etc., a flash emitting part 4, an objective lens 5 of a viewfinder optical system, a light projecting part 6 of an AF light source arranged to project infrared light or the like onto an object of shooting in focusing, an AF light receiving part 7 arranged to receive reflection of light of the AF light source, a knob 8 provided for opening and closing a cover of a film cartridge chamber disposed on the lower side of the camera, a monitor 9 which is composed of a liquid crystal display panel, etc., and is arranged to display images picked up for photographing, a selection switch 10 which is provided for deciding the use or nonuse of the monitor 9, a confirmation switch 11 which is provided for confirming data of information on image correction as will be described later herein, a cross switch 12 provided for selection of the data of information on image correction, a rewinding switch 13 for rewinding a film partially used for photographing, and a viewfinder eyepiece part 14.

Figure 2:
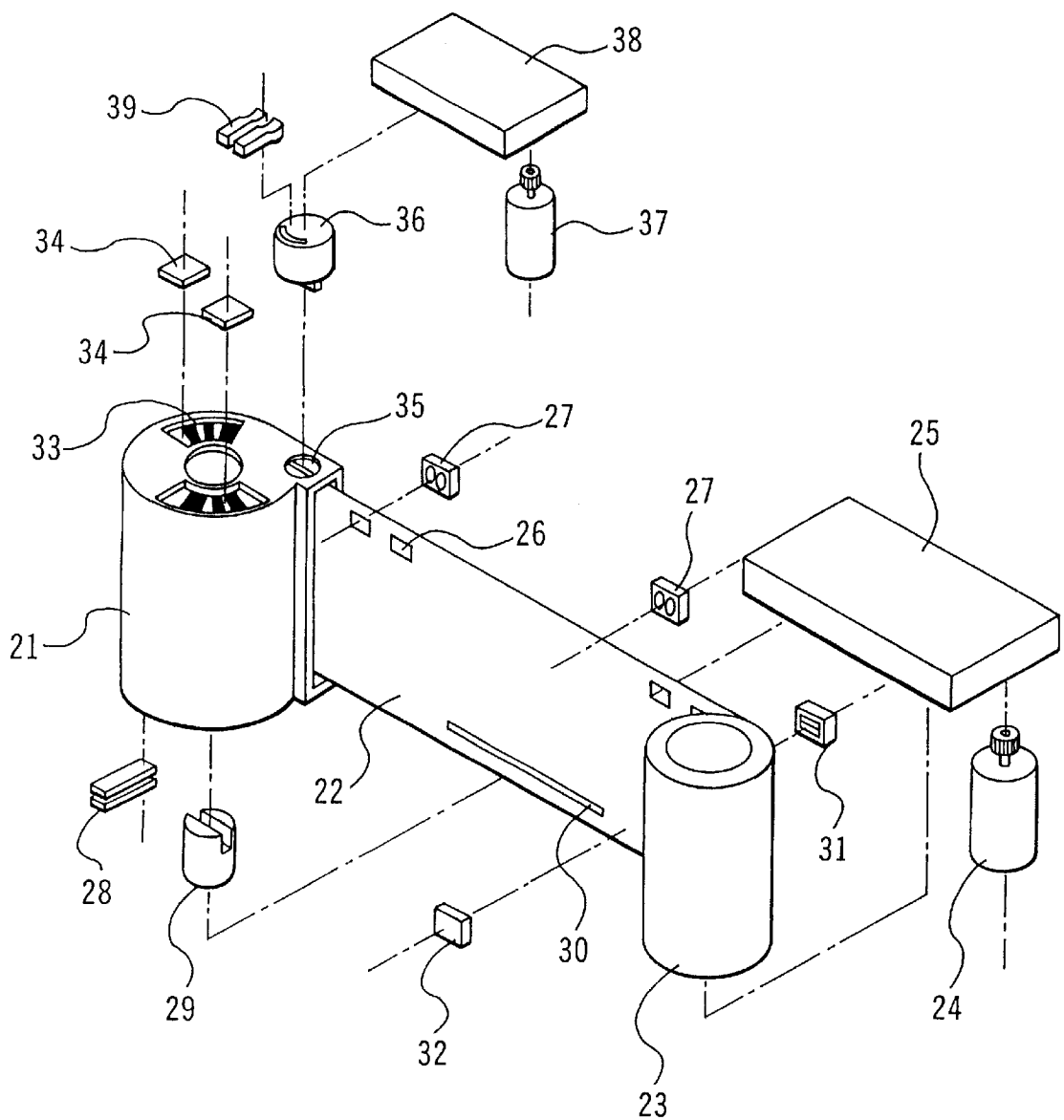
FIG. 2 is an exploded perspective view showing a film cartridge and a film disposed inside of the camera shown in FIGS. 1(a) and 1(b) and parts of the camera arranged around the cartridge and the film.

FIG. 2 shows in an exploded perspective view a film cartridge and a film disposed inside of the camera and parts of the camera arranged around the cartridge and the film.

In FIG. 2, there are illustrated a film cartridge 21, a film 22, a film take-up spool 23, a first motor 24 for winding and rewinding the film 22, a first gear train 25 arranged to connect the first motor 24 to the spool 23, perforations 26 provided in the film 22 for indexing a photo-taking picture plane, and a perforation detecting part 27 arranged to detect the perforations 26. A cartridge presence-or-absence detecting switch 28 is provided for detecting the presence or absence of the film cartridge 21. A fork 29 is connected to the first gear train 25 and is provided for feeding and rewinding the film 22 by causing the shaft of the film cartridge 21 to rotate. A magnetic track 30 is provided on the film 22. A magnetic head 31 is arranged to write and read photo-taking information, etc., into and from the magnetic track 30. A pad 32 is provided for allowing the magnetic head 31 to be pushed against the magnetic track 30 formed on the film 22.

The film cartridge 21 is provided with an information indicating disk 33 which has information recorded in a black-and-white pattern on a disk-shaped member. Information on the film 22, such as its kind, its sensitivity and a number of photo-taking frames, etc., can be found by reading the code pattern of the information indicating disk 33. It is possible to indicate information on the usage state of the film 22, such as an unexposed state, a partially-exposed state or a completely-exposed state of the film 22, by the stopped position of the information indicating disk 33 (such an arrangement is well known, for example, from Japanese Laid-Open Patent Application No. Hei 5-313233). The information indicating disk 33 is arranged to rotate integrally with the shaft of the film cartridge 21.

A film information reading part 34 is composed of photo-reflectors or the like and is arranged to read the code pattern of the information indicating disk 33. An opening-and-closing member 35 is provided for opening and closing a light-blocking door of a film exit port formed in the film cartridge 21. An opening-and-closing driving member 36 is provided for driving the opening-and-closing member 35. A second motor 37 is arranged to actuate the opening-and-closing driving member 36. A second gear train 38 is arranged to connect the second motor 37 to the opening-and-closing driving member 36. A light-blocking-door opened-or-closed state detecting switch 39 is provided for detecting the opened or closed state of the light-blocking door of the film cartridge 21.

Figure 3:
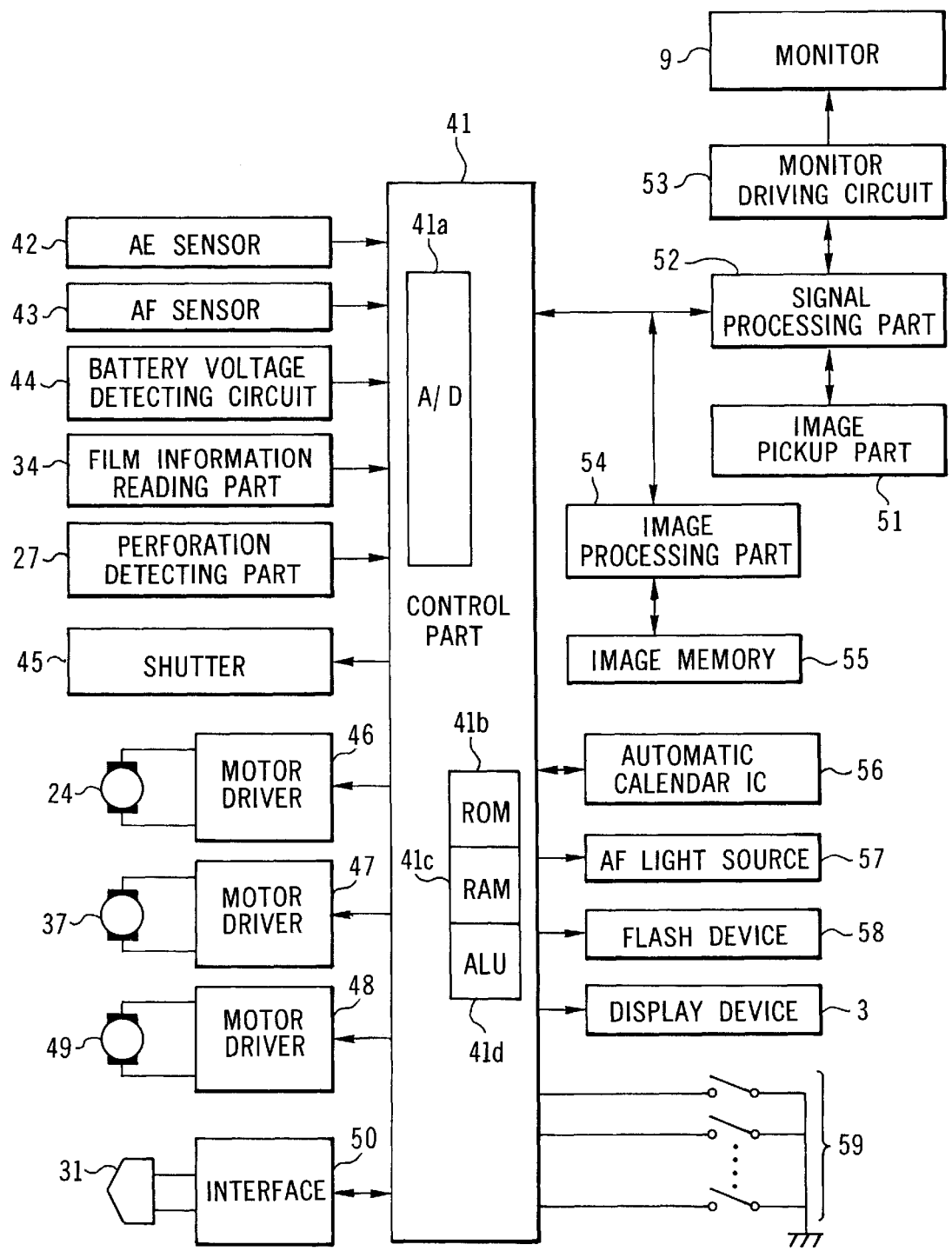
FIG. 3 is a block diagram showing the electrical arrangement of the camera shown in FIGS. 1(a) and 1(b) and FIG. 2.

FIG. 3 is a block diagram showing the electrical arrangement of the camera shown in FIGS. 1(a) and 1(b) and FIG. 2. In FIG. 3, the monitor 9 and the display device 3 are shown also in FIG. 1(b) as described above. Further, the first motor 24, the perforation detecting part 27, the magnetic head 31, the film information reading part 34 and the second motor 37 are shown also in FIG. 2 as described above.

Referring to FIG. 3, a control part 41 is composed of a microcomputer, etc., including therein an ALU 41d, a ROM 41b, a RAM 41c and an A/D converter 41a. The control part 41 is arranged to control the whole camera including its mechanisms, etc. A practical control sequence of the control part 41 will be described in detail later herein. A light measuring (AE) sensor 42 is arranged to obtain information on the luminance of the object of shooting. The AE sensor 42 is composed of, for example, a photodiode, an amplifier, etc., and is connected to the input terminal of the A/D converter 41a of the control part 41. A distance measuring (AF) sensor 43 is arranged to obtain information on a distance to the object and is composed of, for example, a sensor part, such as a PSD or a CCD, and a signal processing part.

The AF sensor 43 is also connected to the input terminal of the A/D converter 41a of the control part 41. A battery voltage detecting circuit 44 has its output connected to the input terminal of the A/D converter 41a of the control part 41 and is arranged to send information on the voltage of a battery which is used as a power source of the camera. The perforation detecting part 27 and the film information reading part 34 also have their outputs connected to the input terminal of the A/D converter 41a of the control part 41.

A shutter 45 is connected to an output terminal of the control part 41 to be controlled by the control part 41. A first motor driver 46 is arranged to drive the first motor 24 and is connected to an output terminal of the control part 41 to be controlled by the control part 41. A second motor driver 47 is arranged to drive the second motor 37 and is connected to an output terminal of the control part 41 to be controlled by the control part 41. A third motor driver 48 is arranged to drive a third motor 49 and is connected to an output terminal of the control part 41 to be controlled by the control part 41. The third motor 49 is arranged to drive a focusing lens (not shown) included in the photo-taking lens 1.

A magnetic signal interface circuit 50 is arranged to receive a signal from the control part 41 and to give an optimum recording current to the magnetic head 31 according to this signal in recording information into the magnetic track 30 on the film 22. In reproducing the recorded information from the magnetic track 30 of the film 22, the magnetic signal interface circuit 50 appositely amplifies a signal reproduced by the magnetic head 31 and performs filtering and wave-shaping processes, etc., on the reproduced signal as necessary. The reproduced signal thus processed is sent from the magnetic signal interface circuit 50 to the control part 41.

An image pickup part 51 is arranged to obtain electronic image information on the object. For example, the image pickup part 51 is composed of a two-dimensional area sensor such as a CCD, a CMOS or the like. A signal processing part 52 is arranged to perform a signal processing action on an image signal obtained from the image pickup part 51. In response to a request from the control part 41, the signal processing part 52 performs a necessary signal processing action and also sends an image display signal to a monitor driving circuit 53. The monitor driving circuit 53 is arranged to cause the monitor 9 to display an image according to the image display signal. Reference numeral 54 denotes an image processing part, and reference numeral 55 denotes an image memory. The image processing part 54 is arranged to compress the image information, in a case where an image signal outputted from the signal processing part 52 is to be temporarily stored in the image memory 55, and to expand the compressed image information in reading out the image signal stored in the image memory 55 for a display on the monitor 9.

An automatic calendar IC 56, which is composed of a quartz crystal oscillator and an integrated circuit for time counting, is arranged to automatically count time to give calendar information on year, month, day, hour and minute, irrespective of the operation of the control part 41. The automatic calendar IC 56 is connected to the control part 41 to enable the control part 41 to read the calendar information at any time as desired. An AF light source 57 is arranged to project infrared light or the like onto the object of shooting in obtaining information on the object distance from the distance measuring sensor 43. The AF light source 57 emits the light in response to a signal received from the control part 41. A flash device 58 is arranged to emit light in response to a signal from the control part 41 in a case where the luminance of an object is found to be insufficient for photo-taking. The display device 3 is arranged to light up each applicable display segment thereof in accordance with a signal from the control part 41. A group of switches 59 of varied kinds includes the shutter button 2, the selection switch 10, the confirmation switch 11, the cross switch 12 and the rewinding switch 13 which are shown in FIGS. 1(a) and 1(b), and also the cartridge presence-or-absence detecting switch 28 and the light-blocking-door opened-or-closed state detecting switch 39 which are shown in FIG. 2, as described in the foregoing.

Figures 4, 5:
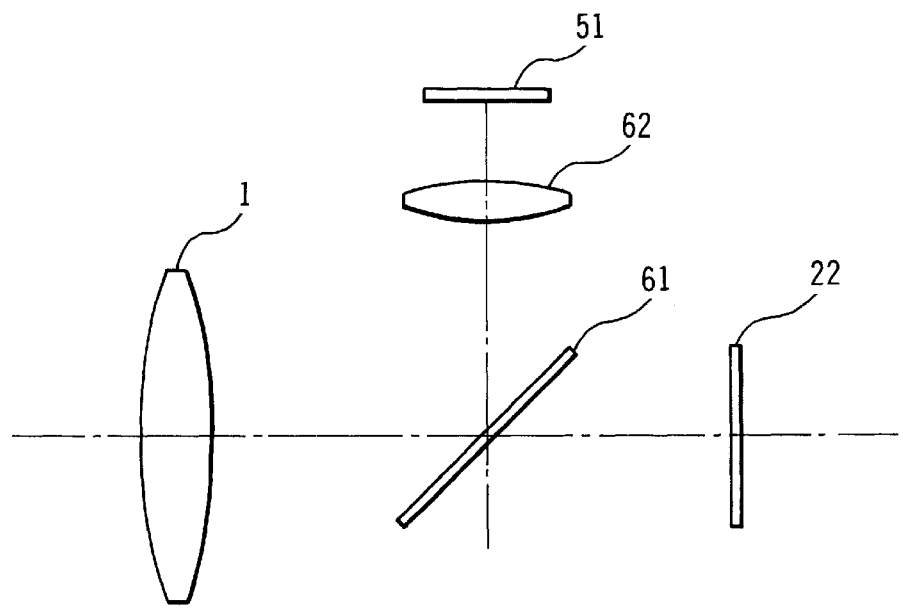
FIG. 4 is a diagram schematically showing a photo-taking optical system of the camera shown in FIGS. and 1(b).
FIG. 5 is a table showing the list of photo-taking information to be magnetically recorded in a magnetic track provided for each of frames of a film by the camera shown in FIGS. 1(a) and 1(b).

FIG. 4 is an explanatory diagram schematically showing a photo-taking optical system of the camera shown in FIGS. 1(a) and 1(b). A light flux passing through the photo-taking lens 1 is split by a light-flux splitting part 61, such as a half-mirror, into a component which is led to the film 22 and another component which is led to the image pickup part 51. Since the size of an image formed on the film 22 and the size of the same image formed on the image pickup part 51 generally differ from each other, an optical system 62 which converts the image size from one size over to another is used as necessary.

FIG. 5 is a table showing the list of photo-taking information, etc., to be magnetically recorded for each of photo-taking frames in the magnetic track 30 on the film 22.

Referring to FIG. 5, a first line of the table shows information on year, month, day, hour and minute as calendar information on photo-taking time obtained by the above-stated automatic calendar IC 56. A second line of the table shows information on the aspect of print, recorded in accordance with the setting made by a print aspect selection switch (not shown). The print aspect is selected from among different sizes for a standard print, a high-vision print, a panorama print, etc. A third line of the table shows information on the use or nonuse of the flash device 58, i.e., information on whether or not the flash device 58 has been used at the time of photo-taking. A fourth line of the table shows information on the luminance of the object obtained from the output signal of the light measuring sensor 42 at the time of photo-taking. A fifth line of the table shows information on a distance to the object obtained from the output signal of the distance measuring sensor 43.

A sixth line of the table shows information on an instruction for correction of a main image. A seventh line of the table shows information on the position of correction of the main image. An eighth line of the table shows information on the output form of an image. More specifically, information on the instruction for correction of the picked-up main image, information on the position of correction of the main image and information on the image output form are recorded on the film 22 as contents of data, for example, as shown in FIGS. 6(a) to 6(c). FIGS. 6(a) to 6(d) are conceptual diagrams showing the form of storage of information on the instruction for correction of the main image, the position of correction of the main image and the image output form.

Information on the instruction for correction of the main image and the image output form is recorded as 8-bit data byte1 shown in FIG. 6(a).

In FIG. 6(a), an SEL bit bit7 indicates whether or not the main image is instructed to be corrected. The main image is not to be corrected when this bit is at "0", and is to be corrected when this bit is at "1".

An MEDIA2 bit bit6, an MEDIA1 bit bit5 and an MEDIA0 bit bit4 constitute information on selection of the output form of a corrected image. For example, the MEDIA2 bit indicates a printing output when it is at "1". The MEDIA1 bit indicates an output to an electronic image storing part when it is at "1". The MEDIA0 bit indicates an output to the film 22 when it is at "1".

In an MODI3 bit bit3 to an MODI0 bit bit0, there is recorded information for indicating the contents of correction of the main image. For example, the MODI3 bit indicates the correction of the eye part of a person image when it is at "1", the MODI2 bit indicates the correction of the face part of the person image when it is at "1", the MODI1 bit indicates the correction of the whole body part of the person image when it is at "1", the MODI0 bit indicates the removal of some obstacle to photographing when it is at "1".

Figure 8:
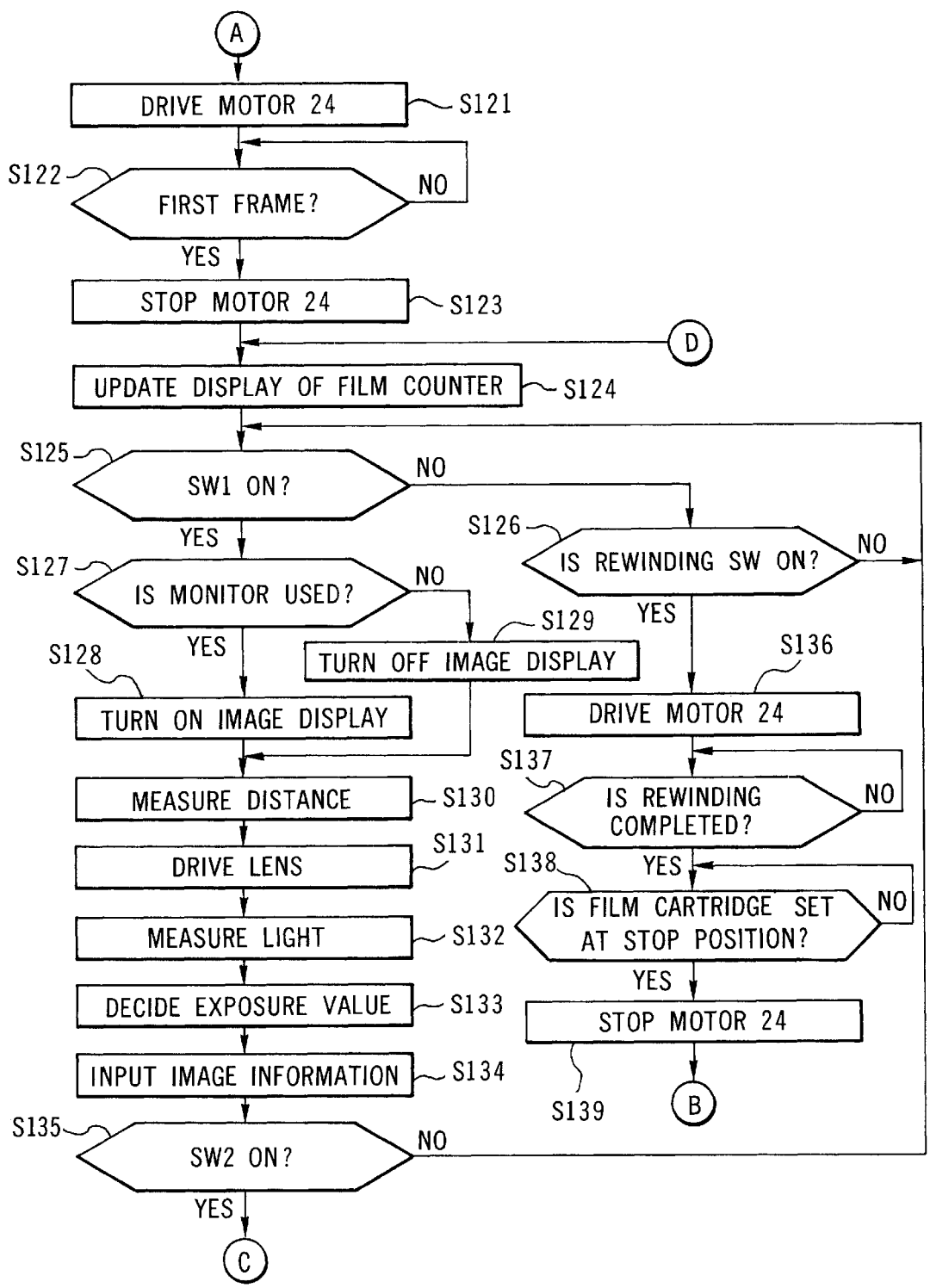
FIG. 8 is a flow chart also showing photo-taking procedures to be executed by the control part of the camera shown in FIGS. 1(a) and 1(b).

The position or part where the main image is to be corrected is designated jointly by 8-bit data byte2 shown in FIG. 6(b) and 8-bit data byte3 shown in FIG. 6(c). As shown in FIG. 6(d), a photo-taking picture plane is divided into 25 areas. The 25 divided areas are arranged to be designated with two-dimensional coordinate data expressed by X0 to X4 and Y0 to Y4.

In the 8-bit data byte2, bits bit4 to bit0 respectively represent the coordinate data X4 to X0. In the 8-bit data byte3, bits bit4 to bit0 respectively represent the coordinate data Y4 to Y0. In each of the 8-bit data byte2 and the 8-bit data byte3, bits bit7 to bit5 are insignificant bits.

The position of correction of the image on the picture plane divided into 25 areas is arranged to be indicated by an intersection point of a column which becomes "1" among the columns of data X0 to X4 and a line which becomes "1" among the lines of data Y0 to Y4. For example, in a case where the position of correction of the image to be designated is at an area "13" shown in FIG. 6(d), the data X2 and the data Y2 are respectively set at "1". Further, if the position of correction of the image to be designated extends over a plurality of areas "15", "20" and "25", for example, the data X4 and the data Y2, Y3 and Y4 are set at "1".

Referring back to FIG. 5, while the contents of photo-taking information to be magnetically recorded in the magnetic track 30 on the film 22 when a shot is taken on each frame are as described above, in the case of the first embodiment, in addition, auxiliary image data are magnetically recorded, as shown at ninth and tenth lines in the table of FIG. 5. The auxiliary image data are electronic image data to be acquired according to a flow of processes shown in the flow charts of FIGS. 7 to 10, and acquired at points of time which differ from the timing of acquiring the main image data.

A sequence of photo-taking processes to be executed by the control part 41 of the camera in the first embodiment of the invention is next described with reference to FIGS. 7 to 10 which are flow charts.

A program for execution of the flow of processes is stored, for example, in the ROM 41b of the control part 41. The program begins to be executed when the control part 41 is rendered operative with a power supply switch (not shown) turned on.

Figure 7:
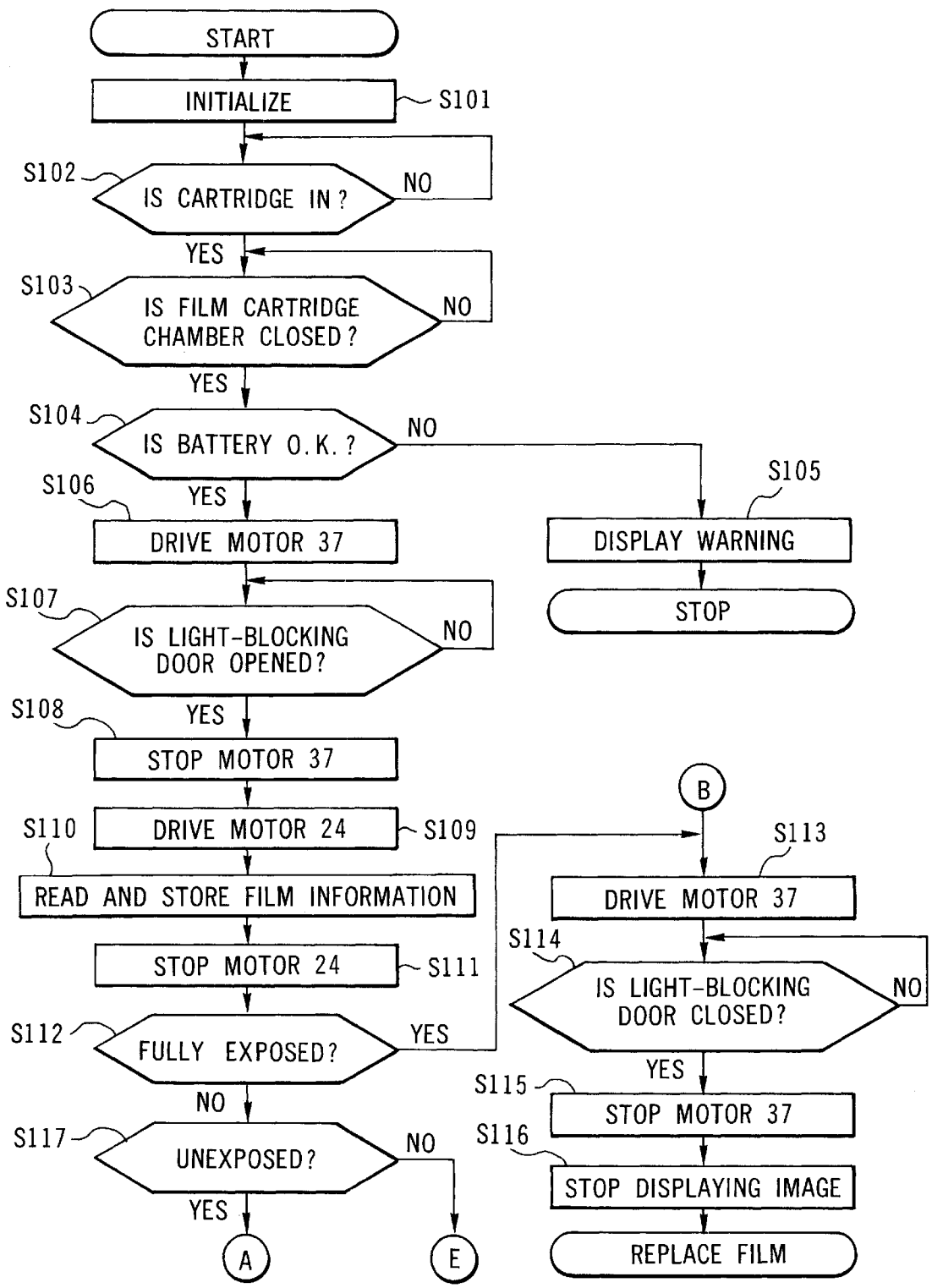
FIG. 7 is a flow chart showing photo-taking procedures to be executed by a control part of the camera shown in FIGS. 1(a) and 1(b).

At a step S101 of FIG. 7, with the power supply switch turned on, the memories and ports within the control part 41 are first initialized.

At a step S102, a check is made, on the basis of a signal from the cartridge presence-or-absence detecting switch 28, to find if the camera is loaded with the film cartridge 21. If not, the step S102 is repeated. If so, the flow of processes proceeds to a step S103. At the step S103, a check is made to find if the film cartridge chamber of the camera is closed with the knob 8 turned. If so, the flow proceeds to a step S104. At the step S104, a check is made, on the basis of a signal obtained by A/D-converting a signal from the battery voltage detecting circuit 44, to find if the voltage of the battery is sufficient for the operation of the camera. If not, the flow proceeds to a step S105 to cause the display device 3 to make a warning display indicating that the battery is out of order. The operation of the camera then comes to a stop. In this instance, the flow is resumed from the process of the step S101 after the battery is replaced.

If the battery voltage is found at the step S104 to be sufficient, the flow proceeds from the step S104 to a step S106. At the step S106, a control signal is sent to the second motor driver 47 to cause the second motor 37 to be driven. At a step S107, a check is made, on the basis of a signal from the light-blocking-door opened-or-closed state detecting switch 39, to find if the light-blocking door is opened. If so, the flow proceeds from the step S107 to a step S108. At the step S108, a control signal is sent to the second motor driver 47 to bring the rotation of the second motor 37 to a stop. At a step S109, a control signal is sent to the first motor driver 46 to cause the first motor 24 to be reversely driven. Then, the information indicating disk 33 begins to rotate. Since the first motor 24 is driven to reversely rotate in this state, the film 22 is not sent out.

At the next step S110, an output signal of the film information reading part 34 is read. Information on the kind, the sensitivity, the state of use for photo-taking, etc., of the film 22 is obtained by decoding the signal thus read. At a step S111, after the signal is read, a control signal is sent to the first motor driver 46 to bring the rotation of the first motor 24 to a stop.

At a step S112, the information on the using state of the film is checked to find if all of the frames of the film have been exposed. If so, the flow proceeds from the step S112 to a step S113. At the step S113, a control signal is sent to the second motor driver 47 to cause the second motor 37 to be driven. At a step S114, a check is made, on the basis of a signal from the light-blocking-door opened-or-closed state detecting switch 39, to find if the light-blocking door is closed. If so, the flow proceeds from the step S114 to a step S115. At the step S115, a control signal is sent to the second motor driver 47 to cause the rotation of the second motor 37 to be brought to a stop. In this instance, the flow might come to the step S115 while an image is left on display at the monitor 9. In such a case, the flow proceeds from the step S115 to a step S116. At the step S116, a signal is sent to the signal processing part 52 to cause the image display to be brought to a stop. Then, the supply of power to the monitor 9 and the image pickup part 51 is turned off. If no image is being displayed by the monitor 9 when the flow comes to the step S116, the step S116 is meaningless. After that, the flow comes into a standby state until the film 22 is replaced.

At the step S112, if the film 22 is found, from the information on the using state of the film, not to have all of its frames completely exposed for photo-taking, the flow proceeds from the step S112 to a step S117. At the step S117, the information on the using state of the film is checked to find if it indicates an unexposed state. If so, the flow proceeds from the step S117 to a step S121, which is shown in FIG. 8. At the step S121, a control signal is sent to the first motor driver 46 to cause the first motor 24 to make normal rotation. As a result, a feeding action on the film 22 begins to be performed.

At a step S122, a check is made, on the basis of a signal from the perforation detecting part 27, to find if the first frame (portion) of the film 22 has come to be set at a predetermined photo-taking position. The flow of processes waits until the first frame is set at the photo-taking position. At the next step S123, with the first frame set at the photo-taking position, a control signal is sent to the first motor driver 46 to cause the rotation of the first motor 24 to be brought to a stop. At a step S124, the count value of a film counter on display at the display device 3 is updated. For example, immediately after the camera is loaded with a new film 22, a count value "1" is displayed at the display device 3.

At a step S125, a check is made for the state of a switch SW1 which is arranged to be turned on by the first stroke of the shutter button 2. If the switch SW1 is found to be not in its on-state, the flow proceeds from the step S125 to a step S126. At the step S126, a check is made to find if the rewinding switch 13 is in its on-state. If not, the flow returns to the step S125 to repeat this step.

If the switch SW1 is found at the step S125 to be in its on-state, the flow proceeds from the step S125 to a step S127. At the step S127, the selection switch 10 which is provided for selecting the use of the monitor 9 is checked for its on-state. If the switch 10 is found to be in its on-state, the flow proceeds to a step S128. At the step S128, since the use of the monitor 9 is selected, a control signal is sent to the signal processing part 52 to acquire an image signal for display on the basis of information on an electronic image picked up by the image pickup part 51. The display image signal thus acquired is sent to the monitor driving circuit 53 to cause the monitor 9 to make a display in real time.

If the selection switch 10 is found at the step S127 to be not in its on-state, the flow proceeds from the step S127 to a step S129. At the step S129, since the monitor 9 is not used in this case, the signal processing part 52 does not send any display image signal to the monitor driving circuit 53. The image display by the monitor 9 then remains in its off-state.

At a step S130, information is obtained from the distance measuring sensor 43 to acquire information on a distance to the object. Further, a lens driving amount necessary for adjusting the focus position of the photo-taking lens 1 to an in-focus position is computed on the basis of information on the object distance acquired. At a step S131, a signal is sent to the third motor driver 48 to cause the third motor 49 to drive a focusing lens according to the computed lens driving amount.

At a step S132, information is obtained from the light measuring sensor 42 to obtain information on the luminance of the object of shooting. At a step S133, an exposure value defined by a shutter speed and an aperture value is decided on the basis of the information on the object luminance thus obtained and also the information on the sensitivity of the film 22 acquired at the step S110. It is decided also at the step S133 to use or not to use the flash device 58 for photo-taking. At a step S134, an electronic image of the object picked up by the image pickup part (image sensor) 51 is transferred from the signal processing part 52 to the image processing part 54. Then, the data of the electronic image transferred is compressed and stored in the image memory 55 in the compressed state.

At a step S135, a check is made for the state of a switch SW2 which is arranged to be turned on by the second stroke of the shutter button 2. If the switch SW2 is found to be not in its on-state as yet, the flow returns to the step S125 to repeat the steps described above.

In a case where the rewinding switch 13 is found at the step S126 to be in its on-state, the flow proceeds from the step S126 to a step S136. At the step S136, a control signal is sent to the first motor driver 46 to cause the first motor 24 to be reversely driven, so that the film 22 begins to be rewound.

At a step S137, a check is made, on the basis of a signal from the perforation detecting part 27 etc., to find if the film 22 has been completely rewound into the cartridge 21. The flow stays at this step until completion of film rewinding.

Upon completion of film rewinding, the flow proceeds from the step S137 to a step S138. At the step S138, a check is made, by reading a signal outputted from the film information reading part 34, to find if the information indicating disk 33 has been set at a predetermined stop position which indicates a partially-exposed state of the film 22. The flow stays at this step until the film information indicating disk 33 comes to the predetermined stop position. When the film information indicating disk 33 is found to be at the predetermined stop position, the flow proceeds from the step S138 to a step S139. At the step S139, a control signal is sent to the first motor driver 46 to cause the rotation of the first motor 24 to be brought to a stop. After that, the flow proceeds to the above-stated step S113 to execute the steps S113 to S116.

Figure 9:
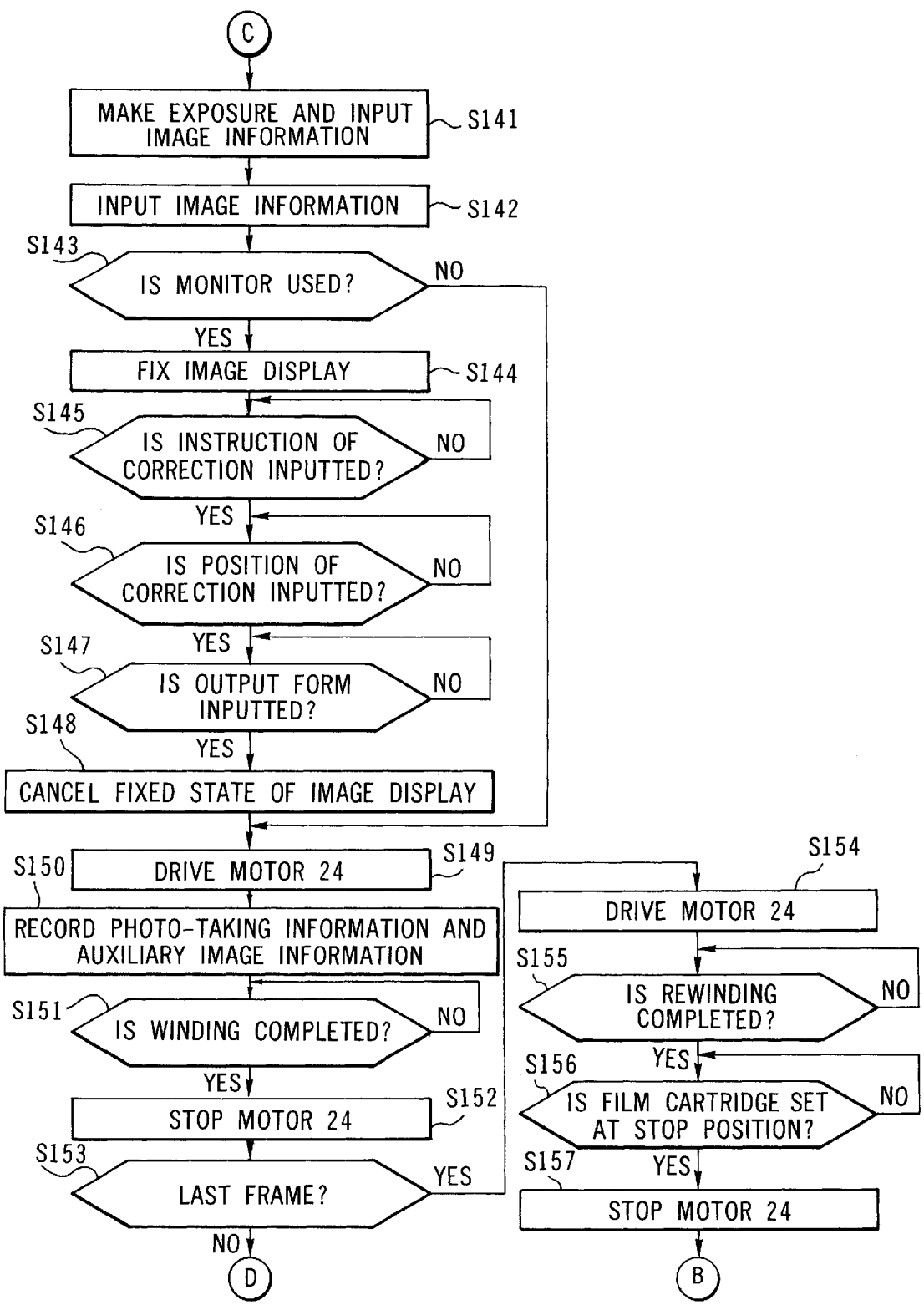
FIG. 9 is a flow chart also showing photo-taking procedures to be executed by the control part of the camera shown in FIGS. 1(a) and 1(b).
Figure 10:
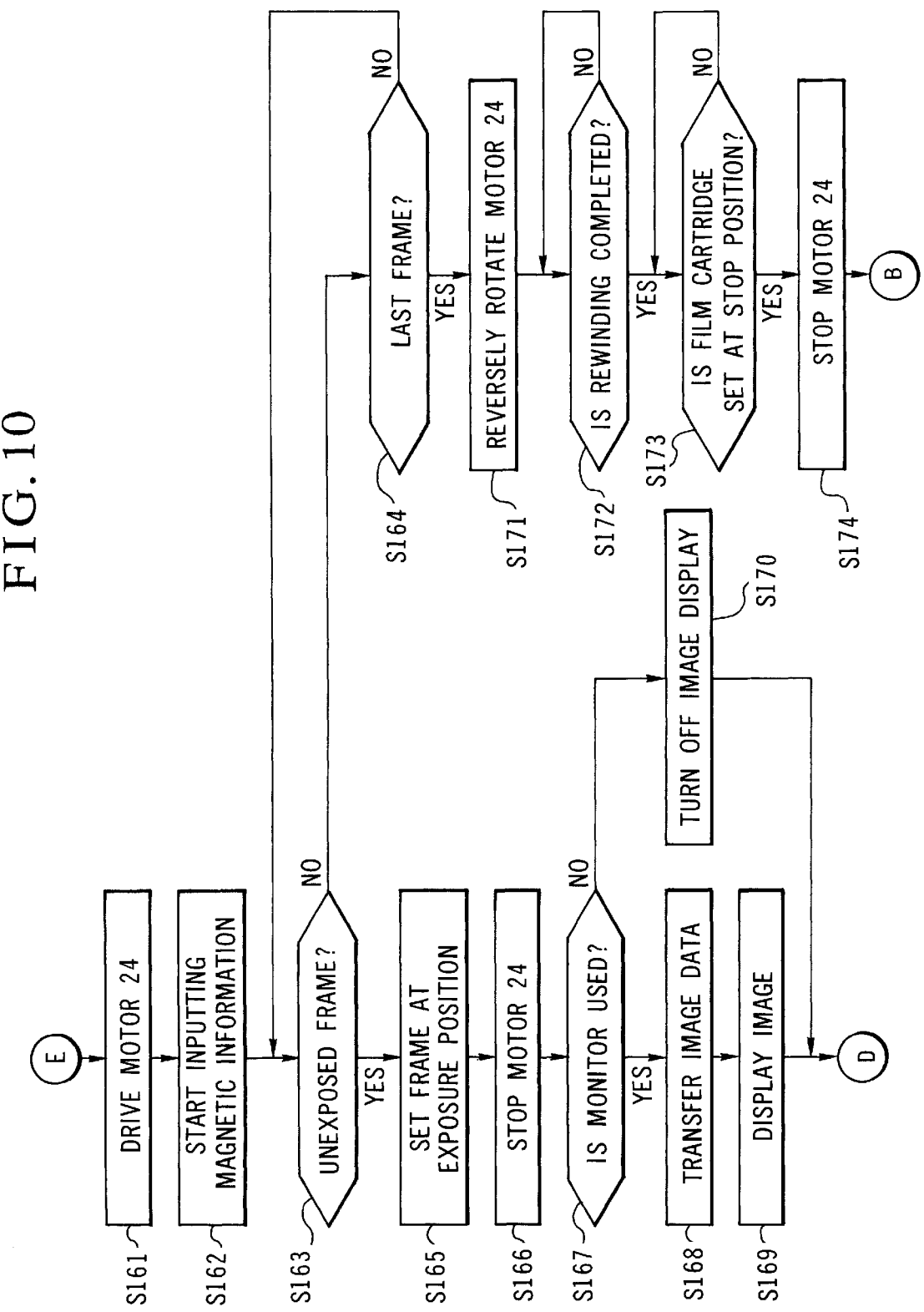
FIG. 10 is a flow chart also showing photo-taking procedures to be executed by the control part of the camera shown in FIGS. 1(a) and 1(b).

If the switch SW2 is found at the step S135 to have been turned on by the second stroke of the shutter button 2, the flow proceeds to the step S141 of FIG. 9. At the step S141, an exposure action is performed on the film 22 by controlling the shutter 45, etc., in accordance with the exposure conditions decided at the step S133. An image obtained by the exposure on the film 22 is a main image. Further, at the step S141, a control signal is sent to the signal processing part 52 and the image processing part 54 to store, in the image memory 55, an electronic image picked up by the image pickup part 51 at a point of time coincident with the timing of the exposure on the film 22.

At a step S142, when a predetermined period of time has elapsed after the process of the step S141, a control signal is sent to the signal processing part 52 and the image processing part 54 to cause again an electronic image picked up by the image pickup part 51 to be stored in the image memory 55.

At a step S143, a check is made for the state of the selection switch 10 for selecting the use or nonuse of the monitor 9. If the selection switch 10 is found to be in its on-state thus indicating that the use of the monitor 9 is selected, the flow proceeds to a step S144. At the step S144, a control signal is sent to the signal processing part 52 and the image processing part 54 to switch the display of an electronic image in real time over to a still image display. The still image to be displayed here is an electronic image picked up at about the same time as the timing of the exposure made on the film 22 at the step S141 and stored in the image memory 55. The still image thus approximately coincides with the main image obtained on the film by the exposure.

At a step S145, a check is made to find if any instruction for correction of the main image has been inputted by the user. If not, the flow waits for inputting of the instruction for correction of the main image. The user is thus allowed to find whether or not there has been any photo-taking failure, by watching an image displayed on the monitor 9 at the step S144. For example, if the user has found that the eyes of a person which is the object of shooting have happened to be closed at the moment of photo-taking, the user is allowed to input an instruction for correction of the eye part of the image of the person by means of the cross switch 12 and to confirm the inputting of the instruction by means of the confirmation switch 11.

Figure 11:
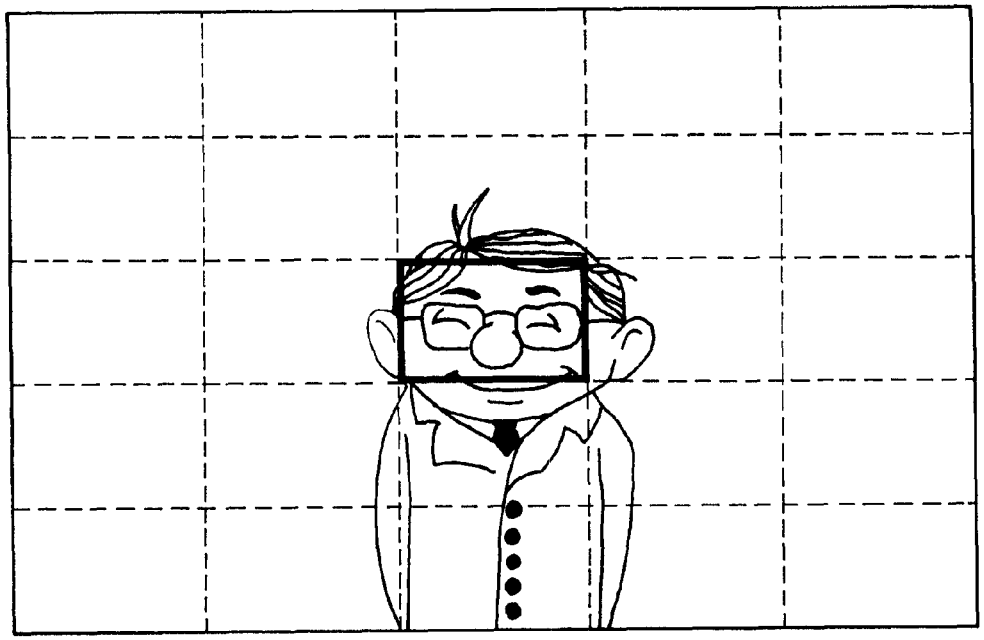
FIG. 11 shows, by way of example, a display made on a monitor shown in FIGS. 1(a) and 1(b).

If the instruction for correction is found at the step S145 to have been inputted, the flow proceeds from the step S145 to a step S146. At the step S146, a check is made to find if the position of correction of the main image has been inputted by the user. For example, in a case where a picked-up image of a person as shown in FIG. 11 is displayed on the monitor 9, the user designates the eye part of the image of the person as the position of correction, while watching the electronic image displayed on the monitor 9. FIG. 11 shows by way of example a display made by the monitor 9. A variety of methods for designating the position of correction are conceivable. For example, a cursor displayed on the monitor 9 may be arranged to be movable by using the cross switch 12 for designating the position of correction. It is also possible to arrange touch-panel-like keys on the surface of the monitor 9 to permit designating a desired part of the main object image directly with a finger. The inputting or no inputting of the position of correction can be found by making a check for the state of the confirmation switch 11 which is arranged to indicate that the position of correction of the main object has become definite. Incidentally, if the confirmation switch 11 is turned on without the designation of the position of correction, no instruction for correction is inputted. In a case where no inputting of the position of correction is found at the step S146, the flow waits until the inputting of the position of correction is found. When the inputting of the position of correction is found, the flow proceeds from the step S146 to a step S147. At the step S147, a check is made to find if the designation of the output form of the corrected image has been inputted by the user. The user designates the output form of the corrected image by selecting one of an output for printing, an output to electronic image storage means and an output to the film by means of the cross switch 12 and making the selection definite by means of the confirmation switch 11.

If no designation of the output form is found at the step S147, the flow waits until the designation of the output form is inputted. When the designation of the output form has been inputted, the flow proceeds from the step S147 to a step S148. At the step S148, a control signal is sent to the signal processing part 52 to cause the image displayed on the monitor 9 in the still-image state at the step S144 to be changed to a real-time image display.

Further, if the selection switch 10 is found at the step S143 to be in its off-state thus indicating the nonuse of the monitor 9, the above-stated steps S144 to S148 are skipped. In this instance, the instruction for correction of the main image, the designation of the position of correction and the designation of the output form by the user are not performed. Therefore, the predetermined default designation becomes applicable. For example, the default designation is such that no instruction of correction of the main image is inputted, the position of correction is not designated and the output for printing is designated.

At a step S149, a control signal is sent to the first motor driver 46 to cause the first motor 24 to be normally driven. The film 22 then begins to be wound. At a step S150, a signal is sent to the magnetic signal interface circuit 50 to cause a recording current to flow to the head 31. The head 31 then records, in the magnetic track 30 on the film 22, photo-taking information data including the data relating to the correction of the main image which is set as mentioned above and auxiliary image data which is electronic image information.

The auxiliary image data includes, as auxiliary image data 1, the image information obtained at the step S134 before photo-taking of the main image, and, as auxiliary image data 2, the image information obtained at the step S142 after photo-taking of the main image. Both of the auxiliary image data 1 and 2 are stored in the image memory 44. Therefore, the image data of two kinds which have been obtained at points of time different from the timing of photo-taking of the main image are made to accompany the main image.

Upon completion of recording the photo-taking information, the film 22 is wound according to a signal from the perforation detecting part 27. At a step S151, a check is made to find if the next photo-taking frame of the film 22 has been set at the predetermined photo-taking position. This check is repeated at the step S151 until completion of film winding to the photo-taking position. At the next step S152, a control signal is sent to the first motor driver 46 to cause the rotation of the first motor 24 to be brought to a stop. At a step S153, a check is made to find if a photo-taking (exposure) action on the last frame of the film 22 has been finished. If not, the flow returns to the step S124 to repeat the above-stated steps. If so, the flow proceeds to a step S154. At the step S154, a control signal is sent to the first motor driver 46 to cause the first motor 24 to be reversely driven. The first motor 24 then rotates to begin rewinding the film 22. At a step S155, a check is made, on the basis of the signal from the perforation detecting part 27, etc., for completion of rewinding the film 22 back to the film cartridge 21. This check is repeated at the step S155 until the film 22 is completely rewound.

Upon completion of the film rewinding, the flow proceeds from the step S155 to a step S156. At the step S156, an output signal of the film information reading part 34 is read and checked to find if the information indicating disk 33 has been set at a predetermined stop position which indicates that all the frames of the film 22 have been completely exposed. This check is repeated at the step S156 until the information indicating disk 33 is set at the predetermined stop position. Then, the flow proceeds from the step S156 to a step S157. At the step S157, a control signal is sent to the first motor driver 46 to cause the rotation of the first motor 24 to be brought to a stop.

After the step S157, the flow proceeds to the step S113 to execute the processes of the steps S113 to S116 in the above-stated manner. The flow of all the procedures comes to an end.

Further, in a case where the information on the using (photo-taking) state of the film 22 is found at the step S117 of FIG. 7 to indicate not an unexposed state, the using state of the film 22 is decided to be a partially-exposed state. The flow then proceeds from the step S117 to a step S161 shown in FIG. 10. At the step S161, a control signal is sent to the first motor driver 46 to cause the first motor 24 to be normally driven. A feeding action on the film 22 then begins.

At the next step S162, to obtain the photo-taking information recorded in the magnetic track 30 on the film 22, a signal is read from the magnetic track 30 by the magnetic head 31 and is inputted through the magnetic signal interface circuit 50. At a step S163, on the basis of a rule for decision making that a frame having photo-taking information recorded in the magnetic track 30 is to be decided as an exposed frame and a frame having no photo-taking information recorded in the magnetic track 30 is to be decided as an unexposed frame, the frames of the film 22 are checked one by one for unexposed frames while the film 22 is being fed. At the step S163, if the frame under the check is found to be not an unexposed frame, i.e., to be an exposed frame, the flow proceeds to a step S164. At the step S164, a check is made to find if the current frame is the last frame of the film 22. If not, the flow returns to the step S163 to perform the checking action of the step S163 on the next frame.

If the current frame is found at the step S163 to be an unexposed frame, the flow proceeds from the step S163 to a step S165. At the step S165, the unexposed frame is set at the predetermined photo-taking (exposure) position on the basis of the signal of the perforation detecting part 27. At a step S166, a control signal is sent to the first motor driver 46 to cause the rotation of the first motor 24 to be brought to a stop.

At a step S167, a check is made for the state of the selection switch 10 which is provided for selection of the use of the monitor 9. If the selection switch 10 is found to be in its on-state thus indicating the use of the monitor 9, the flow proceeds to a step S168. At the step S168, if a frame immediately preceding the unexposed frame has any image information stored as the auxiliary image data together with the photo-taking information data, this image information is transferred to the signal processing part 52. At a step S169, a control signal is sent to the signal processing part 52 to cause the image data transferred to be sent to the monitor driving circuit 53 to be displayed on the monitor 9. Since the image thus displayed on the monitor 9 is an auxiliary image, it somewhat differs from the main image. However, the auxiliary image on display enables the user to know what is a photograph which has been last taken on the film 22 currently loaded on the camera. Upon completion of the image display, the flow returns from the step S169 to the step S124 of FIG. 8.

Meanwhile, if the use of the monitor 9 is found at the step S167 to be not selected, the flow proceeds from the step S167 to a step S170. At the step S170, a control signal is sent to the signal processing part 52 to cause the monitor 9 not to display the image data. After the step S170, the flow returns to the step S124 of FIG. 8.

In a case where the last frame of the film 22 is detected at the step S164, the flow proceeds from the step S164 to a step S171. At the step S171, a control signal is sent to the first motor driver 46 to cause the first motor 24 to be reversely rotated. As a result, the film 22 begins to be rewound. At the next step S172, a check is made, on the basis of the signal of the perforation detecting part 27, etc., to find if the film 22 has been rewound completely back to the film cartridge 21. If not, the check is repeated until the completion of film rewinding is found. Upon completion of film rewinding, the flow proceeds to a step S173. At the step S173, an output signal of the film information reading part 34 is checked to find if the information indicating disk 33 has been set at a predetermined stop position at which the information indicating disk 33 indicates that all the frames of the film 22 have been completely exposed. The check at the step S173 is repeated until the position of the information indicating disk 33 is found to have reached the predetermined stop position.

When the information indicating disk 33 is found to have reached the predetermined stop position, the flow proceeds from the step S173 to a step S174. At the step S174, a control signal is sent to the first motor driver 46 to cause the rotation of the first motor 24 to be brought to a stop. After the step S174, the flow proceeds to the step S113 of FIG. 7 to execute the steps S113 to S116. The flow of procedures then comes to an end.

Figure 12:
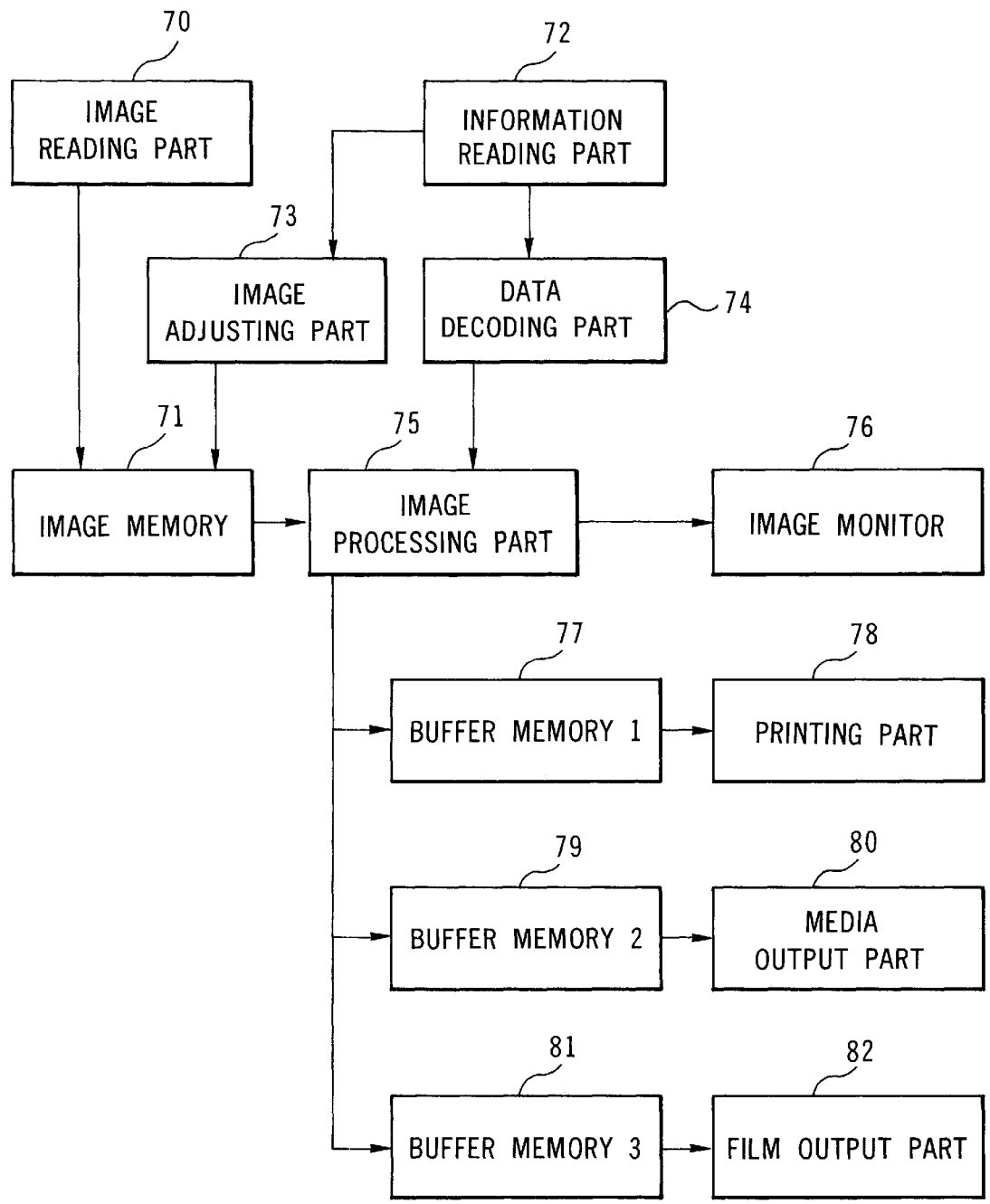
FIG. 12 is a block diagram showing the arrangement of a printer which is capable of carrying out correcting and outputting processes on an image recorded on a film by the camera shown in FIGS. 1(a) and 1(b).

FIG. 12 is a block diagram showing the arrangement of a printer which is capable of carrying out correcting processes and outputting processes on images recorded on the film 22 in accordance with the procedures described above.

Referring to FIG. 12, an image reading part 70 is arranged to read a main image from the film 22 which has been subjected to a development process. An image memory 71 is arranged to store the main image read by the image reading part 70. The image reading part 70 is composed of, for example, a photoelectric conversion element, such as a CCD, and is arranged to convert a visible image on the film 22 into an electrical signal and to A/D-convert the electrical signal into digital main image data. The digital main image data thus obtained is transferred from the image reading part 70 to the image memory 71 to be stored therein. An information reading part 72 is arranged to read the phototaking information of varied kinds and the auxiliary images which have been recorded in the magnetic track 30 on the film 22 at the time of photo-taking. The auxiliary images read by the information reading part 72 are transferred to an image adjusting part 73. Further, the photo-taking information of varied kinds read by the information reading part 72 is transferred to a data decoding part 74.

To make the auxiliary images easily usable for correcting the main image, the image adjusting part 73 is arranged to perform image adjusting actions such as matching of image resolution and adjustment of contrast, color tone, etc. Further, the data decoding part 74 is arranged to decode also the information (byte1 to byte3) relating to image correction as mentioned in the foregoing with reference to FIG. 6. Therefore, checks can be made, in accordance with the procedures described above, for the presence or absence of frames requiring image correction, the contents and positions of correction and the image output form.

An image processing part 75 is arranged to perform image processing actions on the main image data sent from the image memory 71 according to information decoded by the data decoding part 74. The image processing part 75 corrects any image for which image correction is required according to the photo-taking information decoded by the data decoding part 74. In a case where the correction of the main image is designated by the SEL bit of the data byte1, the main image is corrected according to the instruction of the contents of image correction designated by the MODI3 bit to the MODI0 bit. For example, in a case where the main image represents an image in which a person happened to close his or her eyes at the moment of photo-taking and the MODI3 bit is at "1", the eye part of the person image is corrected by the image processing action of the image processing part 75. In this case, the position of correction of the image is indicated as "13" by the 8-bit data byte2 and the 8-bit data byte3 shown in FIG. 6. This arrangement saves the image processing part 75 from the trouble of searching for the eye part of the image from the main image data. At the image processing part 75, one of the auxiliary image data 1 and the auxiliary image data 2 which differ in photo-taking timing from the main image data is inputted from the image adjusting part 73, and a partial image corresponding to the position "13" is cut out from the inputted auxiliary image data. In the above-stated case, for example, it is highly probable that the eyes of the person, which were closed in the main image, were opened in the auxiliary image because of the difference in timing of photo-taking. The image processing part 75, therefore, performs the image processing action to replace the position of correction of the main image with the partial image cut out from the auxiliary image. In this instance, if the cut-out part is simply used for replacement as it is, it might not perfectly fit the original main image. To avoid such misfit, the image is processed in a known manner such as blurring the boundary of the cut-out image part. The main image data which has thus been image-corrected is sent to an image monitor 76 for a preview display. If the result of correction is found at the preview display to be unsatisfactory, the user of the printer can give an instruction to correct the main image again. In the event of correcting the main image again, the image processing part 75 can use the other of the auxiliary image data 1 and the auxiliary image data 2 which has not been used for the first-time correction.

If the main image is found to be satisfactorily corrected, the image is outputted in a manner as indicated by the MEDIA2 bit to the MEDIA0 bit. For example, if the MDEIA2 bit is at "1", it indicates that the print output is designated. Then, the corrected image is transferred to a buffer memory 77 to be printed out by a printing part 78.

The printing part 78 can be selected from among printers of varied kinds including, for example, a ink-jet type printer, a thermal-sublimation type printer, and a printer arranged to make an exposure by illuminating a silver-halide photosensitive material (printing paper) with a laser beam or light of a light source such as a CRT.

In a case where the MEDIA1 bit is at "1", the outputting to an electronic image storage means is designated. In this case, the corrected image is transferred to a buffer memory 79. After that, the image is sent to a media output part 80 to be stored in any one of storage media of varied kinds as digital image data. Such storage media of varied kinds include an optical disk, a magneto-optical disk, a magnetic disk, a semiconductor memory, a magnetic tape, etc.

In a case where the MDIA0 bit is at "1", the outputting to a film is designated. In that case, the corrected image is transferred to a buffer memory 81. The image is then sent to a film output part 82 to have a photographic film exposed therewith by the film output part 82. The film output part 82 is composed of the so-called film recorder which is arranged to illuminate a silver-halide photosensitive material (film) with a laser beam or light of a light source such as a CRT or the like on the basis of the corrected image data. The film output part 82 is arranged such that, when the film is developed after the exposure, the corrected image can be left, on the side of the user, as a visible image on a negative or positive film. The image on the developed film can be printed as a photographic print or prints any time thereafter without necessitating any further correction.

According to the arrangement of the first embodiment, as described above, when a shot is taken with the camera, auxiliary images are inputted at points of time which differ from the timing of photo-taking of a main image. Then, the auxiliary images are recorded on the film 22 together with photo-taking information while accompanying the main image. When the user gives an instruction to correct the main image, therefore, an image necessary for the correction can be readily created or obtained on the side of the printer.

SECOND EMBODIMENT

A second embodiment of the invention is next described with reference to FIGS. 13 to 16.

In the case of the first embodiment described above, the invention is applied to a photographic camera arranged to take a picture of a main image on a photographic film. However, the invention is applicable not only to photographic cameras but also to electronic cameras which are arranged to pick up main images in the form of electronic images.

Figure 13:
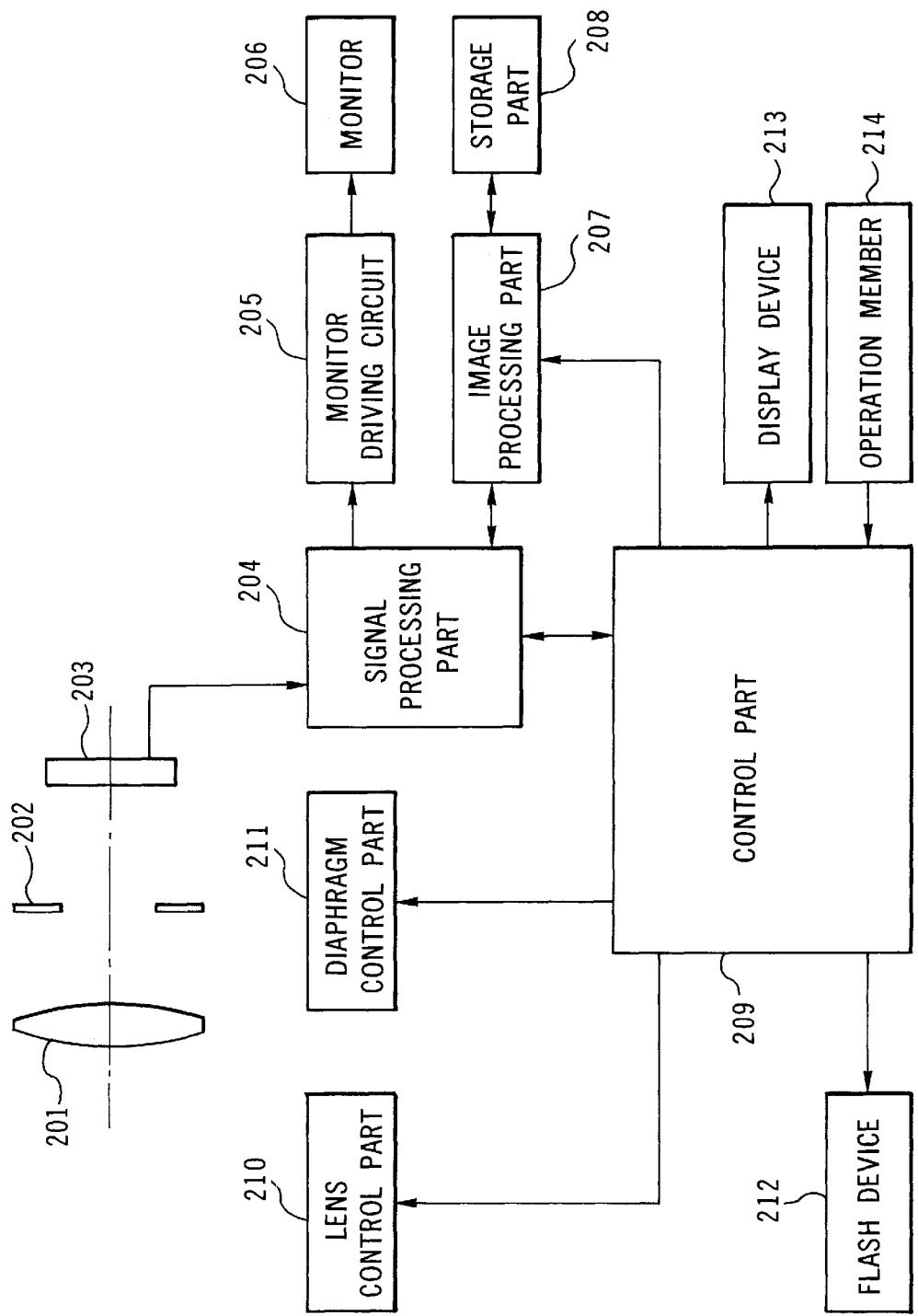
FIG. 13 is a block diagram showing the electrical arrangement of an electronic camera according to a second embodiment of the invention.

FIG. 13 is a block diagram showing by way of example the arrangement of an electronic camera according to a second embodiment of the invention. Referring to FIG. 13, the electronic camera includes a photo-taking lens 201, a diaphragm mechanism 202, and an image sensor 203. The image sensor 203 is arranged to obtain electronic image information on an object of shooting and is, for example, composed of a two-dimensional area sensor, such as a CCD, a CMOS or the like. A signal processing part 204 is arranged to receive a signal from the image sensor 203, to perform a necessary signal processing action on the signal to obtain display image information and to send the display image information to a monitor driving circuit 205. As a result, an image picked up by the image sensor 203 is displayed on a monitor 206. Further, by carrying out the necessary signal processing action, the signal processing part 204 obtains also image information to be stored and sends the storing image information to an image processing part 207. The image processing part 207 is arranged to perform an image processing action, such as compressing or expanding the storing image information, as necessary. A storage part 208 is composed of, for example, a semiconductor memory, a magnetic disk, an optical disk or the like and is arranged to store the image information picked up. The signal processing part 204 is further arranged to send information on the luminance and sharpness of the image to a control part 209. The control part 209 is arranged to control the whole electronic camera. A lens control part 210 is arranged to receive the information on the sharpness of the image and to adjust the focus of the photo-taking lens 201 in accordance with a signal from the control part 209 in such a way as to make the image of the object picked up by the image sensor 203 as sharp as possible. A diaphragm control part 211 is arranged to control the diaphragm mechanism 202. The control part 209 sends to the diaphragm control part 211 an aperture control signal in such a way as to optimize the luminance of the image in accordance with the image luminance information received from the signal processing part 204. A flash device 212 is arranged to emit light in a case where the luminance of the object is insufficient for photo-taking. A display device 213 is composed of a liquid crystal display panel, etc., and is arranged to display the number of picked-up image shots, a warning, etc. The electronic camera is provided with operation members 214 of varied kinds such as a shutter button, a use-of-monitor selection switch, an image-correcting-information confirmation switch, an image-correcting-information selection switch, etc.

Figure 14:
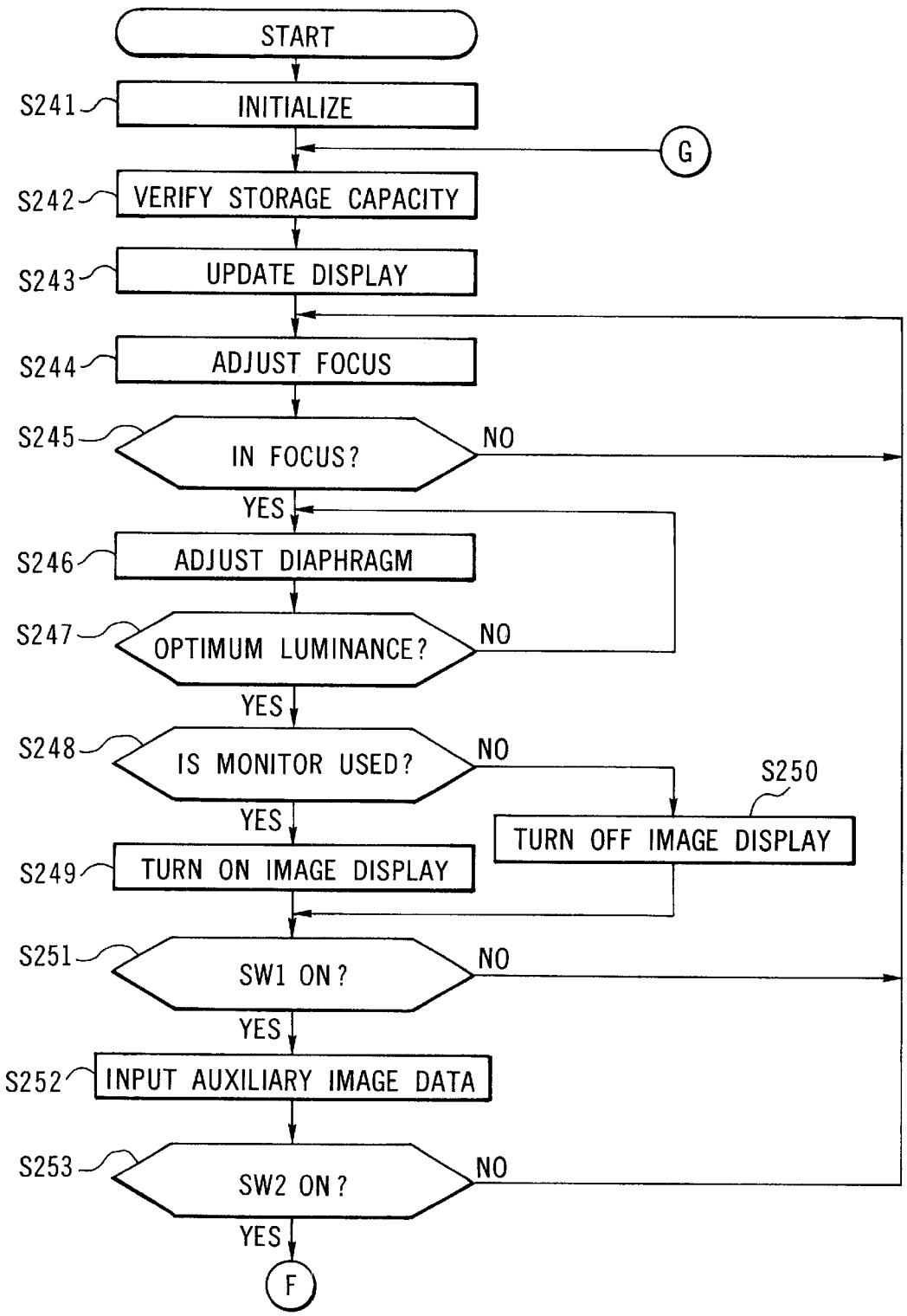
FIG. 14 is a flow chart showing a sequence of actions of a control part of the camera shown in FIG. 13.
Figure 15:
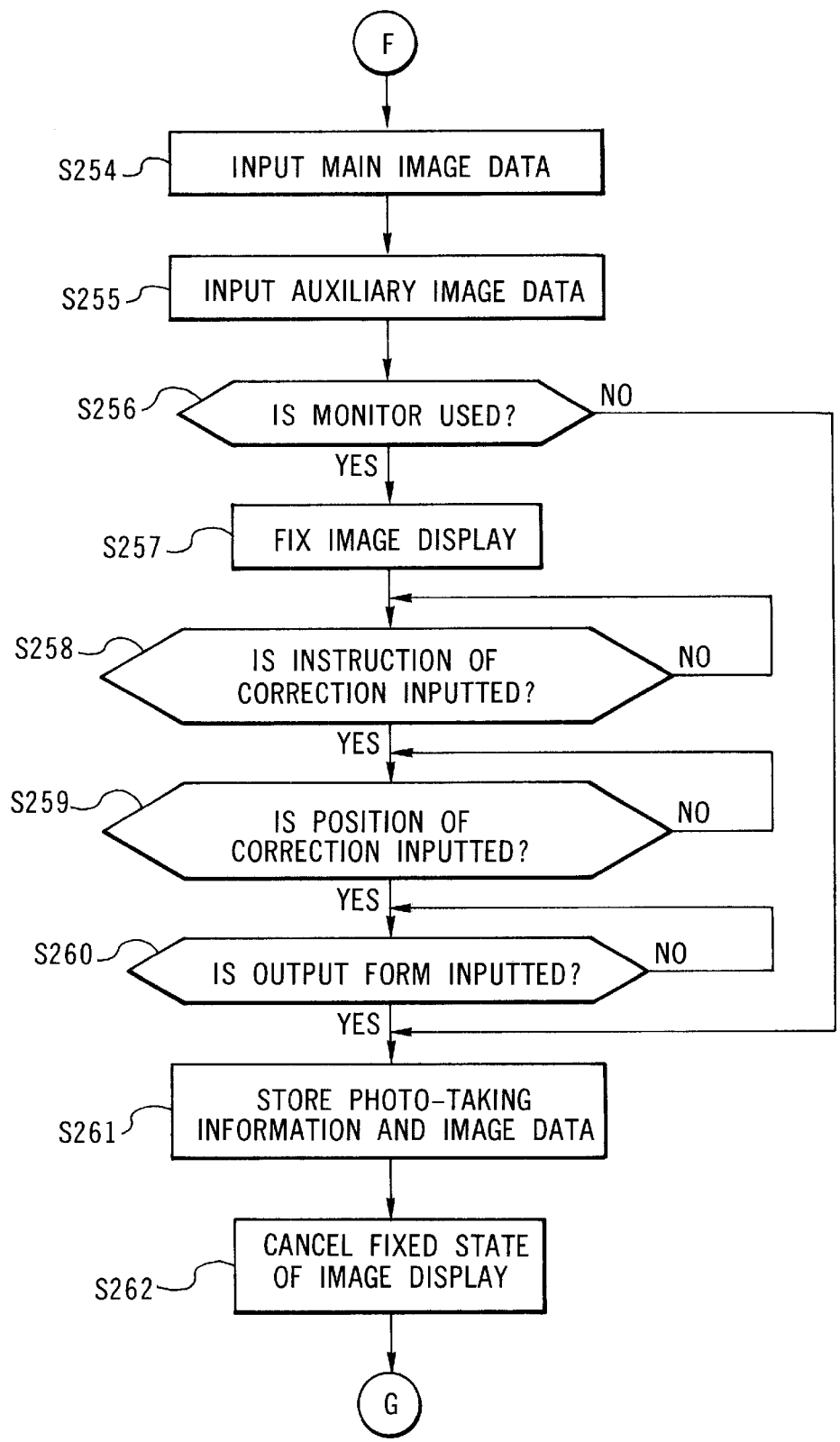
FIG. 15 is a flow chart showing the sequence of actions of the control part of the camera shown in FIG. 13.

FIGS. 14 and 15 are flow charts showing a sequence of processes to be executed by the control part 209. A program for the execution of the flow of operation is caused to start when a power supply switch (not shown) is turned on to make the control part 209 operative. The flow of operation is executed as follows.

At a step S241, the memories and ports of the control part 209 are initialized. At a step S242, the number of shots of images in store, a vacant capacity of the storage part 208, etc., are verified. At a step S243, information on the number of shots of images and the vacant capacity is displayed at the display device 213.

At a step S244, the image sensor 203 begins to pickup an image, and a control signal is sent to the lens control part 210 to cause the focus of the photo-taking lens 201 to be adjusted in such a way as to make the image of the object picked up by the image sensor 203 sharper, on the basis of information on the sharpness of an image outputted from the signal processing part 204. At a step S245, a check is made for an in-focus state, i.e., to find if the object image picked up has come to have a maximum sharpness. If not, the flow returns to the step S244 to repeat the focus adjustment.

When the object image is found to have its best sharpness, an in-focus state is considered to have been attained, and the flow proceeds from the step S245 to a step S246. At the step S246, a control signal is sent to the diaphragm control part 211 according to information on the luminance of the image outputted from the signal processing part 204. In accordance with the control signal, the diaphragm control part 211 adjusts the aperture of the diaphragm mechanism 202. At a step S247, a check is made to find if the image has come to have its best luminance. If so, the flow proceeds to a step S248. If not, the flow returns to the step S246 to repeat the adjustment of the aperture position of the diaphragm mechanism 202.

At the step S248, with the best image luminance obtained, a check is made for the state of a selection switch (not shown) to find if the monitor 206 is to be used. If so, the flow proceeds to a step S249. At the step S249, a control signal is sent to the signal processing part 204 to cause the signal processing part 204 to obtain a display image signal from information on the electronic image picked up by the image sensor 203 and to send the display image signal to the monitor driving circuit 205. The monitor 206 then begins to make an image display in real time. If the monitor 206 is found at the step S248 to be not used, the flow proceeds from the step S248 to a step S250. At the step S250, no display image signal is sent from the signal processing part 204 to the monitor driving circuit 205, so that the image display by the monitor 206 is turned off.

At a step S251, a check is made to find if a switch SW1 which is arranged to be turned on by the first stroke of a shutter button (not shown) is in an on-state. If not, the flow returns to the step S244 to repeat the steps S244 to S250. If so, the flow proceeds to a step S252. At the step S252, an electronic image picked up by the image sensor 203 is transferred from the signal processing part 204 to the image processing part 207 to be data-compressed and temporarily stored at the storage part 208 as auxiliary image data. At a step S253, a check is made to find if a switch SW2 which is arranged to be turned on by the second stroke of the shutter button is in an on-state. If not, the flow returns to the step S244 to repeat the steps S244 to S252.

If the switch SW2 is found at the step S253 to be in its on-state, the flow proceeds from the step S253 to a step S254 shown in FIG. 15. At the step S254, an electronic image picked up by the image sensor 203 is transferred from the signal processing part 204 to the image processing part 207 to be data-compressed, and the compressed data thus obtained is temporarily stored at the storage part 208 as main image data. At a step S255, an electronic image which has been picked up by the image sensor 203, after the lapse of a predetermined period of time from the process of the step S254, is transferred from the signal processing part 204 to the image processing part 207 to be data-compressed, and the compressed data thus obtained is temporarily stored at the storage part 208 as auxiliary image data.

At a step S256, a check is made for the state of the selection switch provided for selection of the use of the monitor 206 to find if the monitor 206 is to be used. If so, the flow proceeds to a step S257. At the step S257, a control signal is sent to the signal processing part 204 and the image processing part 207 to cause the electronic image on display in real time at the monitor 206 to be changed over to a still image display. The still image on display represents the main image data which has been obtained and stored in the storage part 208 at the timing of the step S254.

At a step S258, a check is made to find if any instruction is given by the user for correction of the main image. If not, the flow waits for inputting of the instruction for correction by repeating the check of the step S258. The user is thus allowed to find whether or not there has been any photo-taking failure, by watching the image displayed on the monitor 206 at the step S257. A method for inputting information on the instruction for correction of the main image is the same as in the case of the first embodiment.

If the user inputs the instruction for correction, the flow proceeds from the step S258 to a step S259. At the step S259, a check is made to find if the position of correction of the main image is inputted by the user. If not, the step S259 is repeated. A method for inputting information on the position of correction of the main image is the same as in the case of the first embodiment.

At a step S260, with the position of correction of the main image inputted, a check is made to find if the designation of the output form of the corrected image is inputted by the user. If not, the step S260 is repeated until information on the output form is inputted. A method of inputting information on the output form is the same as in the case of the first embodiment.

At a step S261, photo-taking information data which includes data relating to correction of the main image set at the steps from the step S258 through the step S260 and auxiliary image data which is information on the electronic images are stored in the storage part 208 in correlation with the main image data.

The auxiliary image data includes "auxiliary image data 1" which is the image information obtained at the step S252 before the main image is picked up and "auxiliary image data 2" which is the image information obtained at the step S255 after the main image is picked up. The auxiliary image data 1 and the auxiliary image data 2 are stored while accompanying the main image. Therefore, the main image data is accompanied by two image data obtained at points of time different from the timing at which the main image has been picked up. Since the storage capacity of the storage part 208 is limited, the image information storing amounts of these auxiliary image data 1 and 2 are preferably lessened by processing them to have a lower resolution or a higher rate of compression than the main image data.

Further, a method conforming to the known "Exif" file format or the like may be used for causing the photo-taking information of varied kinds to accompany the main image data which is an electronic image data or for causing the auxiliary image data to accompany the main image data.

At a step S262, a control signal is sent to the signal processing part 204 to change the still image display of the monitor 206 made at the step S257 to a real-time image display. Further, in a case where the monitor 206 is found at the step S256 to be not used, the steps S257 to S260 are skipped. In this instance, the user gives no instruction for correction of the main image, no designation of the position of correction and no designation of the output form. Therefore, the predetermined default designation becomes applicable. For example, the default designation is such that no instruction of correction of the main image is inputted, the position of correction is not designated and the output for printing is designated.

After completion of the process of the step S262, the flow returns to the step S242 to resume the image recording process.

As described above, the auxiliary images can be arranged to be inputted at points of time different from the timing of the main image also in a case where the invention is applied to the electronic camera. It is thus possible to record the auxiliary images on a recording medium together with the photo-taking information as data accompanying the main image. Therefore, in a case where the user gives an instruction to correct the main image, some images necessary for the correction can be readily created and obtained on the side of the printer.

Figure 16:
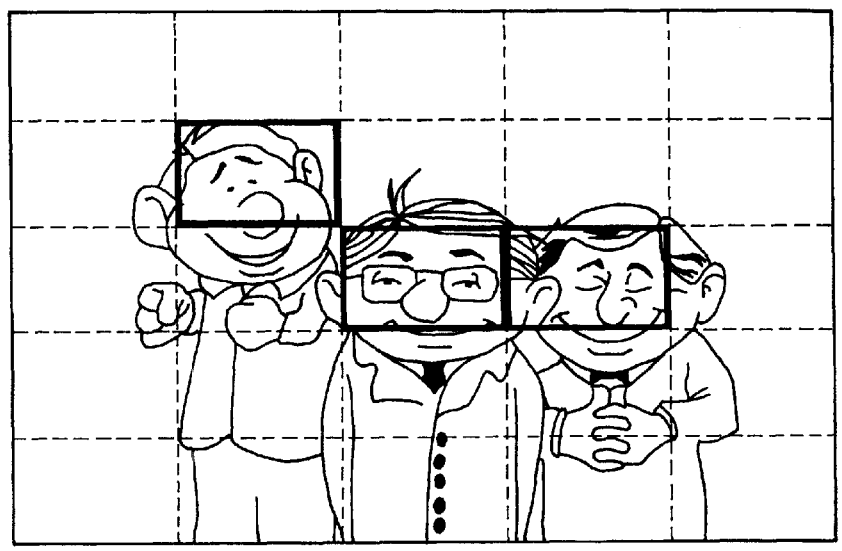
FIG. 16 shows by way of example a display state of candidates for the position of correction obtained in the camera shown in FIG. 13.

Further, the image processing part 207 can be arranged to include a known function disclosed, for example, in Japanese Laid-Open Patent Application No. Hei 8-63597, etc. The function is to extract a face area of a person on the basis of the amount of features such as information on colors or shapes in a two-dimensional image. In the case of an electronic camera having such a function, it is possible to have some candidates for the position of correction displayed on the monitor 206 before inputting of the position of correction, for example, at the step S259. FIG. 16 shows by way of example how the candidates for the position of correction are displayed. In the case of FIG. 16, the main image picked up includes three persons. The image processing part 207, in this case, extracts three areas "7", "13" and "14" as face areas from 25 divided areas. The result of extraction is sent to the signal processing part 204. Then, the monitor driving circuit 205 is caused to display with a cursor the candidates for the position of correction along with the image picked up. The user is allowed to designate the position of correction by selecting one of the candidates for the position of correction. This function enables the user to smoothly input the designation of the position of correction.

The number of the auxiliary image data is not limited to two as in the case of the second embodiment. In a case where the image processing part 207 is arranged to have the function of extracting face areas of persons, information on the number of extracted face areas of the image picked up is also obtainable. In such a case, the number of the auxiliary image data is variable according to the number of the extracted areas. The probability of photo-taking failure such as closing of eyes increases with the number of persons included in one picture. An increase in number of auxiliary image data, therefore, is preferable because the number of images usable for image correction is increased.

Figure 17:
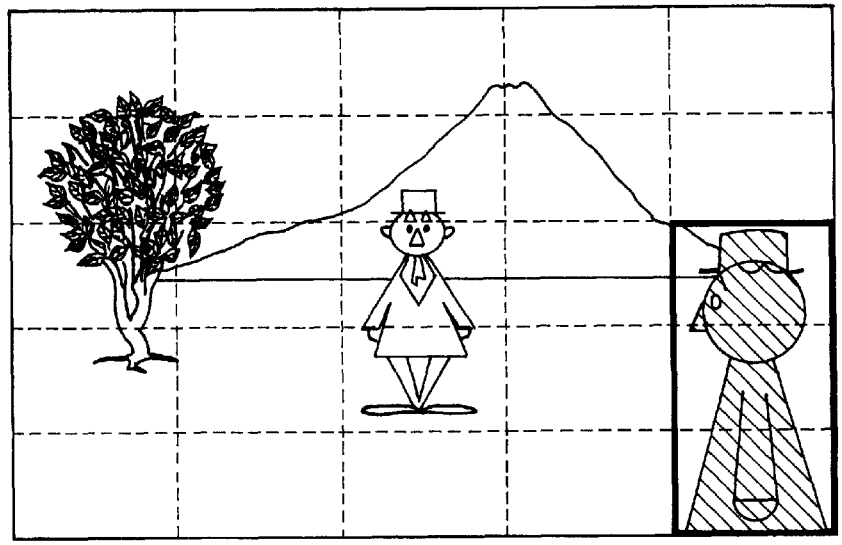
FIG. 17 shows also by way of example a display state of candidates for the position of correction obtained in the camera shown in FIG. 13.

Further, the image processing part 207 may be arranged to have the function of finding correlation among a plurality of images picked up at different points of time used for the coding of a moving image and extracting an image part where the movement or variation saliently takes place among the plurality of images. With the electronic camera arranged to include such a function, it is also possible to cause the monitor 206 to make a preliminary display of candidates for the position of correction before inputting of the position of correction to be made, for example, at the step S259. If a main image includes, for example, an unwanted person who has happened to enter a photo-taking scene when a commemorative shot has been taken with the self-timer function, as shown in FIG. 17, the image processing part 207 extracts from the 25 divided areas, areas "15", "20" and "25"as areas where the movement or variation saliently has taken place between the main image and each of the auxiliary images, and sends the result of extraction to the signal processing part 204. The signal processing part 204 then causes the monitor driving circuit 205 to have the candidates for the position of correction displayed with a cursor along with the image picked up. This display then enables the user to designate the position of correction from among the candidates. Therefore, inputting of the designation of the position of correction can be smoothly made also in a case where an unwanted thing must be removed from the main image.

THIRD EMBODIMENT

A third embodiment of the invention is next described with reference to FIG. 18.

Monitors provided on cameras are generally small in size. Therefore, images displayed there sometimes fail to sufficiently show details of them for finding any photo-taking failure. In view of this situation, it is necessary to have some arrangement that permits giving an instruction for image correction from the side of the printer even if no instruction for image correction is included in the photo-taking information.

Figure 18:
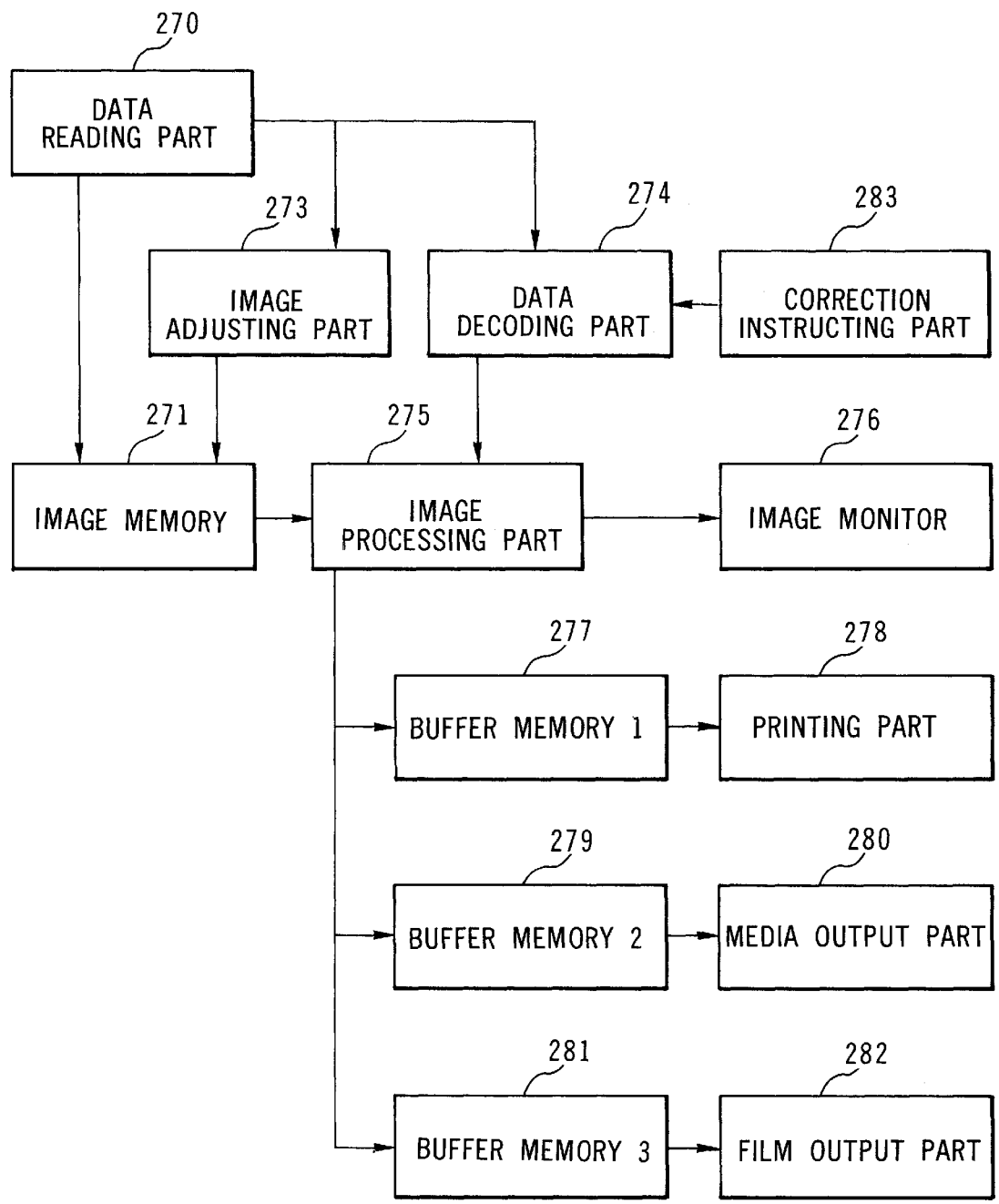
FIG. 18 is a block diagram showing the arrangement of a printer according to a third embodiment of the invention.

FIG. 18 is a block diagram showing the arrangement of a printer according to the third embodiment.

Referring to FIG. 18, a data reading part 270 is arranged to read a data file including a main image, auxiliary images, photo-taking information, etc., stored in varied kinds of storage parts. The main image data read by the data reading part 270 is transferred to an image memory 271. Meanwhile, the auxiliary image data is transferred to an image adjusting part 273. The photo-taking information is transferred to a data decoding part 274. The image adjusting part 273 is arranged to make image adjustment such as image resolution matching, contrast adjustment, color-tone adjustment, etc., for the purpose of making the auxiliary images readily usable for correcting the main image. The data decoding part 274 is arranged to decode also the information relating to image correction (byte1, byte2 and byte3) described in the foregoing with reference to FIG. 6. The data decoding part 274 makes checks for the presence-or-absence of any frame requiring image correction, for the contents or position of the image correction and for the output form of the image, in the same manner as described in the foregoing with reference to FIG. 6.

At an image processing part 275, the main image data sent from the image memory 271 is processed in accordance with information sent from the data decoding part 274. The image processing part 275 corrects any image for which image correction is prescribed or directed in the photo-taking information decoded by the data decoding part 274.

In a case where the correction of the main image is designated by the SEL bit of the data byte1 as mentioned above, the main image is corrected in accordance with the instruction of the contents of image correction designated by the MODI3 bit to the MODI0 bit. For example, in a case where a main image has the intrusion of an unwanted person as shown in FIG. 17 and the MODI0 bit is at "1", an image processing action is performed to remove the image of the obstacle, i.e., the intruding person. In this instance, the positions of correction of the main image are indicated as areas "15", "20" and "25" by the 8-bit data byte2 and the 8-bit data byte3. The image processing part 275 thus can be saved from the trouble of searching for the obstacle from the image data of the main image.

At the image processing part 275, one of the auxiliary image data 1 and the auxiliary image data 2 which differ in photo-taking timing from the main image is inputted from the image adjusting part 273. Then, a partial image corresponding to the positions of the divided areas "15", "20" and "25" is cut out from the inputted auxiliary image data. Since the probability of not having the intruding obstacle in the auxiliary image is high, because of the difference in photo-taking time, although the obstacle is included in the main image, the image processing part 275 performs the image processing action to replace the position of correction of the main image with the partial image cut out from the auxiliary image. In this instance, if the cut-out part is simply used for replacement as it is, it might fail to adequately fit the original main image. To avoid such misfit, a known image processing method of blurring the boundary of the cut-out image part or the like is adopted.

The main image data which has thus been image-corrected is sent to an image monitor 276 for a preview display. If the result of image correction is found at the preview display to be not satisfactory, the user of the printer is allowed to give an instruction to recorrect the main image. In the event of such an instruction for recorrection of the main image, the image processing part 275 can adopt the method of correcting the main image by using the other of the auxiliary image data 1 and the auxiliary image data 2 which has not been used for the first-time correction.

If the main image is found to be satisfactorily corrected, the corrected image is outputted in a manner as indicated by the MEDIA2 bit to the MEDIA0 bit. For example, if the MEDIA2 bit is at "1", which indicates a print output, the corrected image is transferred to a buffer memory 277 to be printed out by a printing part 278. The printing part 278 can be selected from among printers of varied kinds including, for example, a ink-jet type printer, a thermal-sublimation type printer, and a printer arranged to make an exposure by illuminating a silver-halide photosensitive material (printing paper) with a laser beam or light of a light source such as a CRT.

In a case where the MEDIA1 bit is at "1", the outputting to an electronic image storage means is designated. In this case, the corrected image is transferred to a buffer memory 279. After that, the image is sent to a media output part 280 to be stored in any one of storage media of varied kinds as digital image data. Such storage media of varied kinds include an optical disk, a magneto-optical disk, a magnetic-disk, a semiconductor memory, a magnetic tape, etc.

In a case where the MDIA0 bit is at "1", the outputting to a film is designated. In that case, the corrected image is transferred to a buffer memory 281. The image is then sent to a film output part 282 to have a photographic film exposed therewith by the film output part 282. The film output part 282 is composed of the so-called film recorder which is arranged to illuminate a silver-halide photosensitive material (film) with a laser beam or light of a light source such as a CRT or the like on the basis of the corrected image data. The film output part 282 is arranged such that, when the film is developed after the exposure, the corrected image can be left, on the side of the user, as a visible image on a negative or positive film. The image on the developed film can be printed as a photographic print or prints any time thereafter without necessitating any further correction.

Even in a case where no instruction for image correction is included in the photo-taking information accompanying the main image, if the user of the printer finds a main image on display for preview to require image correction, the image correction can be carried out by inputting an instruction for image correction from a correction instructing part 283.

The correction instructing part 283 is provided with an operation member for allowing the user to give instructions, at the printer, with regard to the contents or position of image correction and to the output form as necessary. Further, the correction instructing part 283 also has the function of sending correction data to the data decoding part 274 according to an operation performed on the operation member. The correction data is arranged preferably in a manner similar to the data arrangement described in the foregoing with reference to FIG. 6.

The data decoding part 274 is arranged such that, even if no instruction data for image correction is included in the photo-taking information, the decoding part 274 gives an instruction to the image processing part 275 to make image correction if the correction data is received from the correction instructing part 283. The monitor 276 which is disposed at the printer may be of a size larger than the monitor provided on the camera. The monitor 276 of the printer is, therefore, capable of showing thereon the details of images. Therefore, an instruction for image correction can be given at the printer even in a case where the necessity for the same image correction cannot be found at the camera.

The printer usable for each of the embodiments described above is not limited to a laser beam printer and an ink-jet type printer. Printers of other types are of course usable.

The object of the invention can be of course attained by supplying a system or an apparatus with a storage medium in which software program codes for realizing the functions of each of the embodiments described above are recorded, reading the program codes out from the storage medium with a computer (a CPU or an MPU) included in the system or the apparatus, and executing the program codes.

In such a case, the program codes read out from the storage medium represent the novel functions of the invention, and the storage medium in which the program codes are recorded is considered to constitute the invention.

The storage medium usable for supplying the program codes can be selected from among various media, such as a floppy disk, a hard disk, an optical disk, a magneto-optical disk, a CD-ROM, a CD-R, a magnetic tape, a nonvolatile memory card, a ROM, etc.

Further, the functions of each of the embodiments described above can be realized by executing the program codes read out by a computer as mentioned above. However, the scope of the invention of course includes also a case where an OS (operating system) or the like operating on a computer is arranged to execute actual processes in part or in their entirety in such a way as to realize the functions of each of the embodiments described above.

The scope of the invention further includes a case where the program codes read out from the storage medium as mentioned above are written into a memory which is disposed within a function extending board inserted in the computer or a function extending unit connected to the computer, and, after that, actual processes are executed, either in part or in their entirety, on the basis of instructions of the program codes by a CPU or the like disposed in the function extending board or the function extending unit to realize the functions of each of the embodiments described above.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The software arrangement and the hardware arrangement in each of the embodiments described above are interchangeable as desired.

The invention may be carried out by combining as necessary the embodiments or their technological elements described in the foregoing.

The invention applies to cases where either the whole or a part of claims or the arrangement of each embodiment described forms one apparatus or is used in combination with some other apparatuses or as a component element of an apparatus.

Further, the invention is applicable to cameras of varied kinds, such as a video movie camera, a video still camera, a single-lens reflex camera, a lens-shutter camera, a surveillance camera and other apparatuses. The invention is also applicable to an image pickup apparatus other than cameras, an image reading apparatus, an optical apparatus, etc., devices adapted for a camera, an image pickup apparatus, an image reading apparatus, an optical apparatuses, etc., component elements forming such apparatuses or devices, methods for controlling these apparatuses and devices, and computer program products providing such control methods.

What is claimed is:

1. A camera comprising:
   (A) a photo-taking instruction device which gives an instruction for photo-taking;
   (B) an image recording device which records an object image as a photo-taking image in response to the instruction for photo-taking given by said photo-taking instruction device, said image recording device recording, as a correction image to be used for correcting the photo-taking image, an object image obtained at a point of time different from a point of time at which the photo-taking image is obtained; and
   (C) a correction instruction device which instructs whether to use the recorded correction image for correcting the photo-taking image.

2. A camera according to claim 1, wherein said image recording device records the correction image in response to the instruction for photo-taking given by said photo-taking instruction device.

3. A camera according to claim 1, wherein said image recording device includes a timer to be used for recording the correction image a predetermined period of time after the instruction for photo-taking is given by said photo-taking instruction device.

4. A camera according to claim 1, wherein said image recording device, in response to the instruction for photo-taking given by said photo-taking instruction device, records, as the correction image, an object image obtained at a point of time prior to the point of time at which the photo-taking image is obtained.

5. A camera according to claim 1, wherein said image recording device records, as the correction image, an object image obtained in response to a first-step operation of said photo-taking instruction device, and records, as the photo-taking image, an object image obtained in response to a second-step operation of said photo-taking instruction device.

6. A camera according to claim 1, wherein said image recording device records the correction image in such a way as to accompany the photo-taking image corresponding thereto.

7. A camera according to claim 1, wherein said image recording device records information relating to the correction image in such a way as to accompany the photo-taking image corresponding thereto.

8. A camera according to claim 7, further comprising an input device which inputs the information relating to the correction image.

9. A camera according to claim 8, wherein said input device is capable of inputting, as the information relating to the correction image, information relating to correction of the photo-taking image to be made by using the correction image.

10. A camera according to claim 9, wherein said input device is capable of inputting, as the information relating to correction, information on a position of correction of the photo-taking image.

11. A camera according to claim 1, further comprising an input device which inputs the information relating to the correction image.

12. A camera according to claim 1, wherein said image recording device records information relating to an output form of the photo-taking image corrected by using the correction image.

13. A camera according to claim 1, wherein said image recording device records information relating to each output form of the photo-taking image corrected by using the correction image.

14. A camera according to claim 1, further comprising a display device which displays a position of correction of the photo-taking image.

15. A camera according to claim 1, further comprising a display device which displays a candidate for a position of correction of the photo-taking image.

16. A camera according to claim 1, further comprising a display device which automatically selects a candidate for a position of correction of the photo-taking image and displays the candidate.

17. A camera according to claim 1, wherein said image recording device records the photo-taking image on a photographic film.

18. A camera according to claim 17, wherein said image recording device magnetically records the correction image on the photographic film.

19. A camera according to claim 1, wherein said image recording device records the photo-taking image and the correction image as electronic data.

20. A camera according to claim 1, wherein said image recording device records the photo-taking image as electronic data and records the correction image as electronic data which has a less amount of image information than the electronic data of the photo-taking image.

21. A camera according to claim 1, wherein said image recording device records the photo-taking image as a still image.

22. A camera according to claim 21, wherein said image recording device records the correction image as a still image.

23. A camera according to claim 1, wherein said image recording device records the correction image as a still image.

24. An image correcting apparatus comprising:
   (A) a photo-taking instruction device which gives an instruction for photo-taking;
   (B) an image recording device which records an object image as a photo-taking image in response to the instruction for photo-taking given by said photo-taking instruction device, said image recording device recording, as a correction image to be used for correcting the photo-taking image, an object image obtained at a point of time different from a point of time at which the photo-taking image is obtained; and
   (C) a correction instruction device which instructs whether to use the recorded correct on image for correcting the photo-taking image.

25. An image correcting system comprising:
   (A) a photo-taking instruction device which gives an instruction for photo-taking;
   (B) an image recording device which records an object image as a photo-taking image in response to the instruction for photo-taking given by said photo-taking instruction device, said image recording device recording, as a correction image to be used for correcting the photo-taking image, an object image obtained at a point of time different from a point of time at which the photo-taking image is obtained;
   (C) a correction instruction device which instructs whether to use the recorded correction image for correcting the photo-taking image; and
   (D) an output device which corrects, with the correction image, the photo-taking image recorded by said image recording device and outputs the corrected phototaking image in accordance with an instruction of said correction instruction device.

26. An image correcting system according to claim 25, wherein said image recording device records the correction image in response to the instruction for photo-taking given by said photo-taking instruction device.

27. An image correcting system according to claim 25, wherein said image recording device, in response to the instruction for photo-taking given by said photo-taking instruction device, records, as the correction image, an object image obtained at a point of time prior to the point of time at which the photo-taking image is obtained.

28. An image correcting system according to claim 25, wherein said image recording device records, as the correction image, an object image obtained in response to a first-step operation of said photo-taking instruction device, and records, as the photo-taking image, an object image obtained in response to a second-step operation of said photo-taking instruction device.

29. An image correcting method, comprising the steps of:

recording an object image as a photo-taking image; and recording, as a correction image to be used for correcting the photo-taking image, an object image obtained at a point of time different from a point of time at which the photo-taking image is obtained instructing whether to use the recorded correction image for correcting the photo-taking image.

30. A computer program product which provides an image correcting method comprising the steps of:

recording an object image as a photo-taking image; and recording, as a correction image to be used for correcting the photo-taking image, an object image obtained at a point of time different from a point of time at which the photo-taking image is obtained instructing whether to use the recorded correction image for correcting the photo-taking image.

* * * * *